US008898664B2

(12) United States Patent
Bhandari et al.

(10) Patent No.: US 8,898,664 B2
(45) Date of Patent: Nov. 25, 2014

(54) EXPOSURE OF VIRTUAL CACHE TOPOLOGY TO A GUEST OPERATING SYSTEM

(75) Inventors: Aditya Bhandari, Redmond, WA (US); Dmitry Meshchaninov, Maple Valley, WA (US); Shuvabrata Ganguly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 12/791,800

(22) Filed: Jun. 1, 2010

(65) Prior Publication Data

US 2011/0296407 A1    Dec. 1, 2011

(51) Int. Cl.
    *G06F 9/455*    (2006.01)

(52) U.S. Cl.
    CPC ...................................... *G06F 9/455* (2013.01)
    USPC .......................................................... 718/1

(58) Field of Classification Search
    None
    See application file for complete search history.

(56) References Cited

U.S. PATENT DOCUMENTS

| 5,287,508 | A  | * | 2/1994  | Hejna et al. ................... 718/102 |
| 6,269,391 | B1 |   | 7/2001  | Gillespie |
| 7,409,689 | B2 |   | 8/2008  | Jones et al. |
| 7,617,375 | B2 |   | 11/2009 | Flemming et al. |
| 7,653,909 | B2 |   | 1/2010  | Brenner |
| 8,069,444 | B2 |   | 11/2011 | Fedorova |
| 8,276,009 | B2 |   | 9/2012  | King |
| 2006/0136653 | A1 | * | 6/2006 | Traut et al. ........................ 711/6 |
| 2006/0136930 | A1 | * | 6/2006 | Kaler et al. .................... 718/105 |
| 2006/0150184 | A1 | * | 7/2006 | Hankins et al. ............... 718/100 |
| 2006/0206892 | A1 |   | 9/2006 | Vega et al. |
| 2008/0235690 | A1 |   | 9/2008 | Ang et al. |
| 2008/0244221 | A1 | * | 10/2008 | Newell et al. .................... 712/11 |
| 2009/0055693 | A1 |   | 2/2009 | Budko et al. |
| 2009/0313445 | A1 |   | 12/2009 | Pandey et al. |
| 2010/0299671 | A1 |   | 11/2010 | Kinsey |
| 2011/0055479 | A1 |   | 3/2011 | West et al. |
| 2011/0231857 | A1 |   | 9/2011 | Zaroo et al. |

OTHER PUBLICATIONS

"Chapter1—Intoduction", National Tsing Hua University Institutional Repository, (No Month Available) 2010, 1-6.
Back et al., "Application-Specific System Customization on Many-Core Platforms: The VT-ASOS Framework Position paper", (No Month Available) 2007, 1-6.
Congdon, "Architecture for Hardware Hypervisor Network Offload", ECS 201—Advanced Computer Architecture, (Non Month Available) Winter 2008, 23 pages.
Duda et al., "Borrowed-Virtual-Time (BVT) Scheduling: Supporting Latency-Sensitive Threads in a General-Purpose Scheduler", ACM SIGOPS Operating Systems Review, 33(5), Dec. 1999, 261-276.

(Continued)

*Primary Examiner* — Emerson Puente
*Assistant Examiner* — Dong Kim
(74) *Attorney, Agent, or Firm* — John Jardine; Kate Drakos; Micky Minhas

(57) ABSTRACT

In a virtual machine environment, a hypervisor is configured to expose a virtual cache topology to a guest operating system, such that the virtual cache topology may be provided by corresponding physical cache topology. The virtual cache topology may be determined by the hypervisor or, in the case of a datacenter environment, may be determined by the datacenter's management system. The virtual cache topology may be calculated from the physical cache topology of the system such that virtual machines may be instantiated with virtual processors and virtual cache that may be mapped to corresponding logical processors and physical cache.

20 Claims, 15 Drawing Sheets

(56) References Cited

OTHER PUBLICATIONS

Gavrilovska et al., "High-Performance Hypervisor Architectures: Virtualization in HPC Systems", 1st Workshop on System-level Virtualization for High Performance Computing, Mar. 20, 2007, 8 pages.

Msdn, "Other Scheduling Considerations", Windows Driver Kit, Mar. 19, 2010, 1 page.

Nikolopoulos et al., "VT-ASOS: Holistic System Software Customization for Many Cores", Proceedings of the Workshop on the NSF Next Generation Software Program, held in conjunction with the 22nd IEEE International Parallel and Distributed Processing Symposium, IEEE Computer Society, (No Month Available) 2008, 5 pages.

Ongaro et al., "Scheduling I/O in Virtual Machine Monitors", Proceedings of the fourth ACM SIGPLAN/SIGOPS international conference on Virtual execution environments, Mar. 5-7, 2008, 10 pages.

Vmware, "Best Practices Using VMware Virtual SMP", VMware ESX Server 2, Best Practices Using VMware Virtual SMP, (No Month Available) 2008, 1-8.

Vmware, "ESX Server Performance and Resource Management for CPU-Intensive Workloads", VMware ESX Server 2, Vmware White Paper, Dec. 14, 2005, 1-23.

* cited by examiner

EXPOSURE OF VIRTUAL CACHE TOPOLOGY TO A GUEST OPERATING SYSTEM

CROSS REFERENCE TO RELATED APPLICATION

This application is related by subject matter to U.S. application Ser. No. 12/791,790 entitled "Hypervisor Scheduler" filed on Jun. 1, 2010, the contents of which are herein incorporated by reference in their entirety.

BACKGROUND

A virtual machine may have one or more virtual processors that are exposed to a guest operating system as single core processors. When a guest operating system runs a workload, it schedules a thread to run on one of these virtual processors. A hypervisor runs and schedules a thread that represents the virtual processor on a logical processor of a physical machine that hosts the virtual machine. The workload in the thread runs and some, hopefully useful, work is performed. The hypervisor then runs another thread on the same or a different logical processor. The hypervisor scheduler thus must determine both when and where to schedule a particular virtual processor. Proper placement of the virtual processors is a key to maintaining high levels of performance.

Proper placement of the virtual processors may include moving a thread to a logical processor on another node. For example, a hypervisor may schedule a virtual processor to run in a first NUMA (Non-Uniform Memory Architecture) node and then move it to another NUMA node. This technique ensures that workloads are run as fast as possible and any overhead due to cache misses is tolerated.

The decision to expose virtual processors as single core processors was made to make virtualization of the physical architecture of the host machine easier. For example, guest operating systems are written so that the topology is checked on boot. If the guest was moved to another host with a different topology it may operate inefficiently because the resources it expects are no longer present.

As systems that include logical processors that share various different caches become more common, it would be beneficial to configure a hypervisor to leverage these cache-sharing logical processors. Moreover, it would be beneficial to expose some sort of cache topology to a guest operating system so that the scheduler in the guest operating system can also make intelligent scheduling decisions.

SUMMARY

Techniques are disclosed for exposure of virtual cache topology by a hypervisor to a guest operating system in a virtual machine environment. Exposure of virtual cache topology to a guest operating system allows for a scheduler in the guest operating system to make intelligent scheduling decisions while maintaining the abstraction between hardware and virtual hardware. The virtual cache topology may be determined by the hypervisor or, in the case of a datacenter environment, may be determined by the datacenter's management system. The virtual cache topology is calculated from the physical cache topology of the system such that virtual machines may be instantiated with virtual processors and virtual cache that may be mapped to corresponding logical processors and physical cache.

Various embodiments for determining virtual cache topology are disclosed. In one such embodiment, the virtual cache topology is made up of a sharing cardinality and a sharing level. The sharing cardinality and sharing level are determined such that virtual processors may be mapped to logical processors and their associated cache. In another embodiment, a datacenter's management system may receive instruction that modifies the sharing cardinality and/or sharing level. In yet another embodiment, if the physical mapping of virtual processors to logical processors and their associated cache is not initially successful using the virtual cache topology, a method is disclosed to modify the way virtual processors and logical processors and their associated cache are mapped.

After exposure of the virtual cache topology to the guest operating system, the guest operating system's scheduler schedules a thread for a process on a virtual processor. In response, the hypervisor scheduler schedules a thread indicative of a virtual processor on a logical processor. In various embodiments, the thread indicative of a virtual processor may be scheduled on an idle logical processor that shares a level of cache with an ideal logical processor; scheduled on an idle logical processor that shares a cache with a maximum number of logical currently executing virtual processors; scheduled on a logical processor based on how long ago the thread ran on that logical processor; or queued to run on a logical processor where the thread recently ran.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
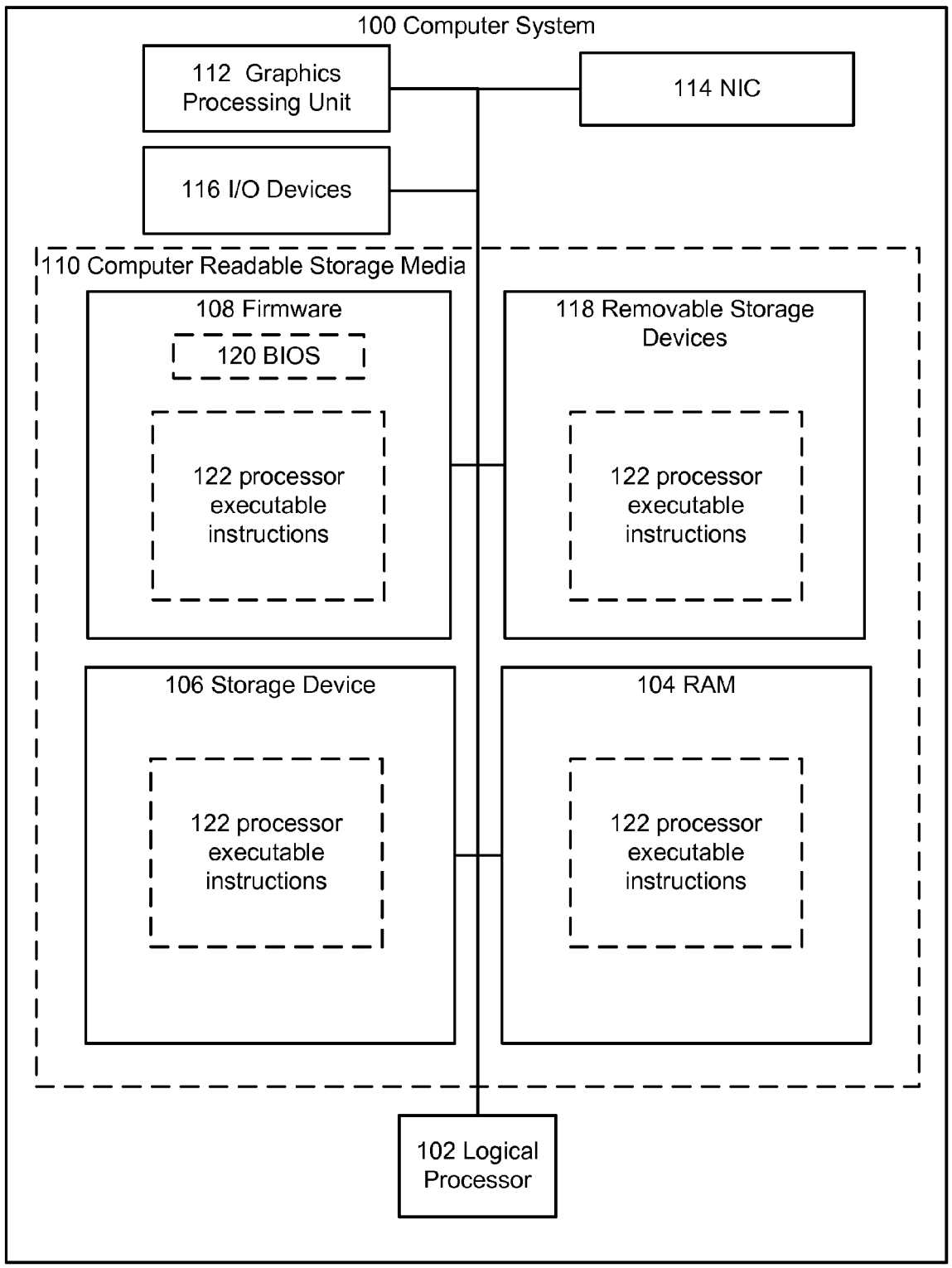
FIG. 1 depicts an example computer system wherein the disclosed subject matter can be implemented.

Embodiments may execute on one or more computer systems. FIG. 1 and the following discussion are intended to provide a brief general description of a suitable computing environment in which the disclosed subject matter can be implemented.

The term circuitry used throughout the description can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software, an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by FIG. 1, various computer readable storage media 110 can be interconnected by one or more system busses that couples various system components to the logical processor 102. The system busses may be any of several types of bus structures including a memory bus or memory controller, a peripheral bus, and a local bus using any of a variety of bus architectures. In example embodiments, the computer readable storage media 110 can include, for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer readable storage media 110 can provide non volatile and volatile storage of processor executable instructions 122, data structures, program modules, and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 that can include, but are not limited to, a keyboard, and pointing device. Other input devices may include a microphone, joystick, game pad, scanner, or the like. These and other input devices are often connected to logical processor 102 through a serial port interface that is coupled to the system bus, but may be connected by other interfaces, such as a parallel port, game port, or universal serial bus (USB). A display or other type of display device can also be connected to the system bus via an interface, such as a video adapter, that can be part of or connected to a graphics processor unit 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers. The remote computer may be another computer, a server, a router, a network PC, a peer device, or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the disclosed subject matter can be implemented are particularly well-suited for computerized systems, nothing in this document is intended to limit the disclosed subject matter can be implemented to such embodiments.

Figure 2:
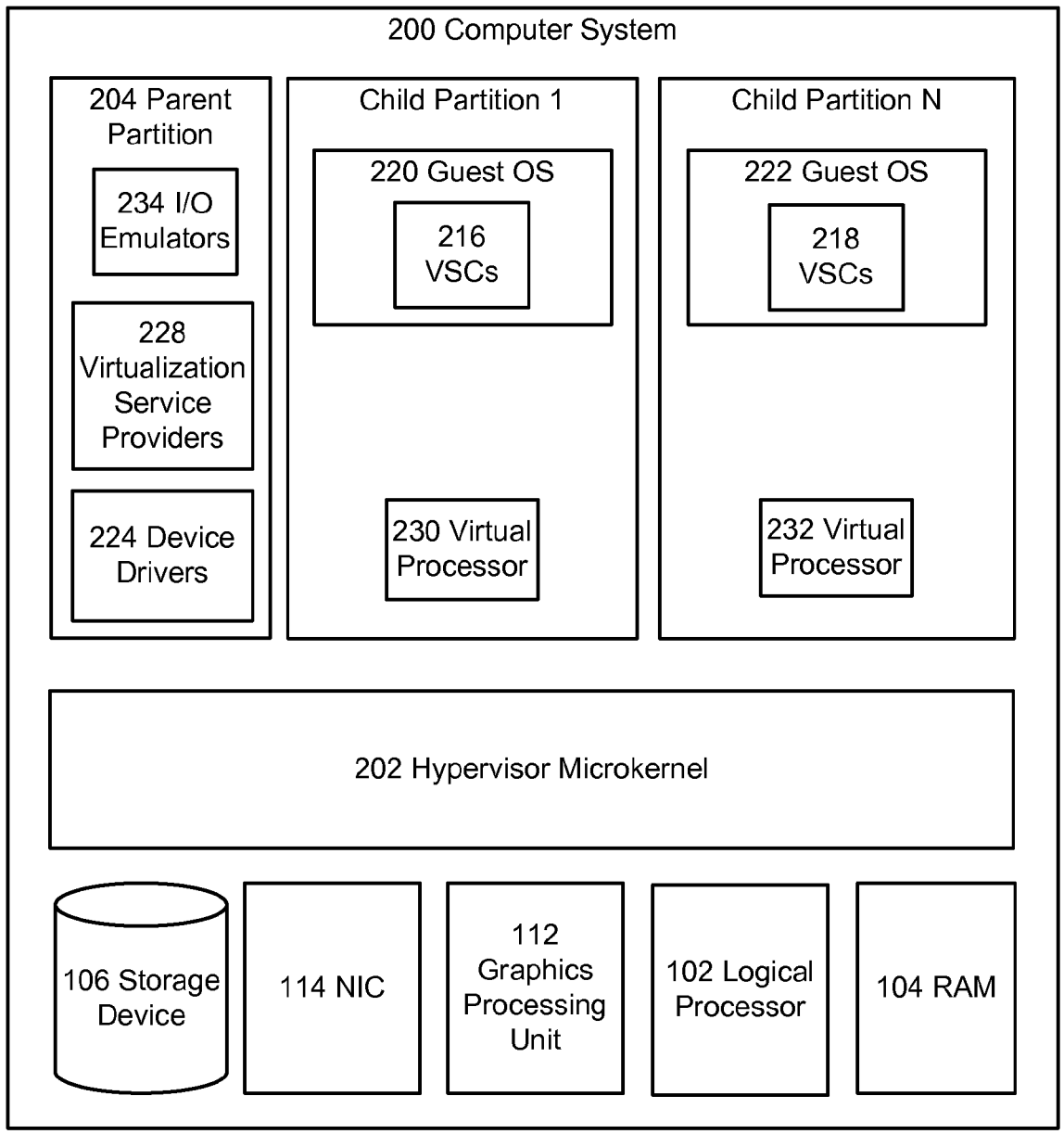
FIG. 2 depicts an operational environment for practicing aspects of the present disclosure.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments, a child partition is the basic unit of isolation supported by hypervisor microkernel 202. That is, each child partition can be mapped to a set of hardware resources, e.g., memory, devices, logical processor cycles, etc., that is under control of the hypervisor microkernel 202. Hypervisor microkernel 202 can isolate processes in one partition from accessing another partition's resources, e.g., a guest operating system in one partition may be isolated from the memory of another partition and thus may not be able to detect memory addresses outside of its partition. In embodiments, hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of system memory. Guest memory is a partition's view of memory that is controlled by a hypervisor. The guest physical address (GPA) can be backed by system physical address (SPA), i.e., the memory of the physical computer system, managed by the hypervisor. In an embodiment, the GPAs and SPAs can be arranged into memory blocks, i.e., one or more pages of memory. When a guest writes to a block using its page table, the data is actually stored in a block with a different system address according to the system wide page table used by the hypervisor.

In the depicted example, parent partition component 204 can be thought of as similar to domain 0 of Xen's open source hypervisor. Parent partition 204 in this operational environment can be configured to provide resources to guest operating systems executing in the child partitions 1-N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by FIG. 2, I/O emulators 234, e.g., virtualized IDE devices, virtualized video adaptors, virtualized NICs, etc., can be configured to run within the parent partition 204 and attached to resources available to guest operating systems 220 and 222. For example, when a guest operating system touches a register of a virtual device or memory mapped to the virtual device, microkernel hypervisor 202 can intercept the request and pass the values the guest attempted to write to an associated emulator.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processors execute hypervisor instructions. The combination of virtual processors and memory in a partition can be considered a virtual machine.

Guest operating systems can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
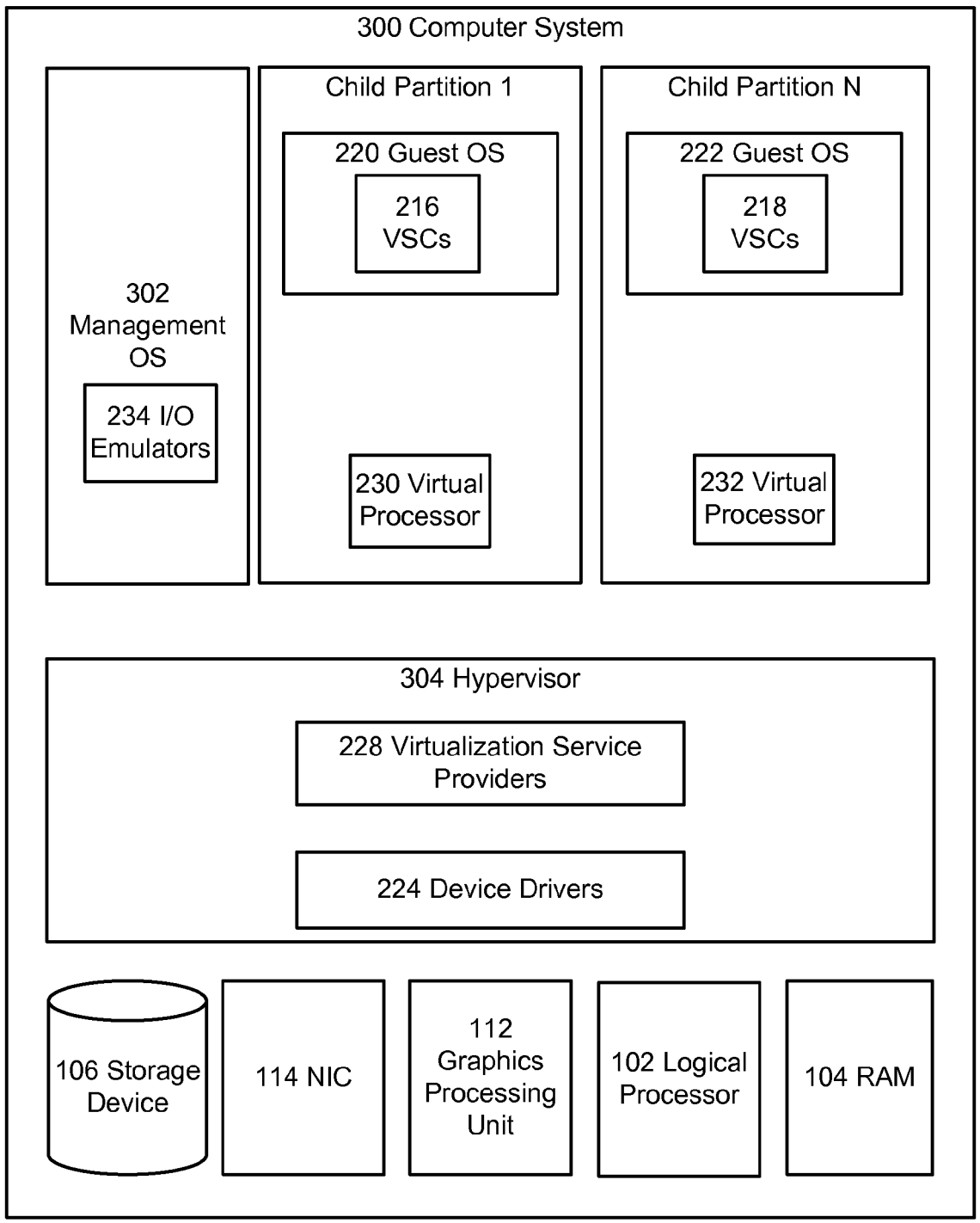
FIG. 3 depicts an operational environment for practicing aspects of the present disclosure.

Referring now to FIG. 3, it illustrates an alternative architecture to that described above in FIG. 2. FIG. 3 depicts similar components to those of FIG. 2; however, in this example embodiment, the hypervisor 304 can include the microkernel component and components from the parent partition 204 of FIG. 2 such as the virtualization service providers 228 and device drivers 224 while management operating system 302 may contain, for example, configuration utilities used to configure hypervisor 304. In this architecture, hypervisor 304 can perform the same or similar functions as hypervisor microkernel 202 of FIG. 2; however, in this architecture, hypervisor 304 can be configured to provide resources to guest operating systems executing in the child partitions. Hypervisor 304 of FIG. 3 can be a stand alone software product, a part of an operating system, embedded within firmware of the motherboard, or a portion of hypervisor 304 can be effectuated by specialized integrated circuits.

Figure 4:
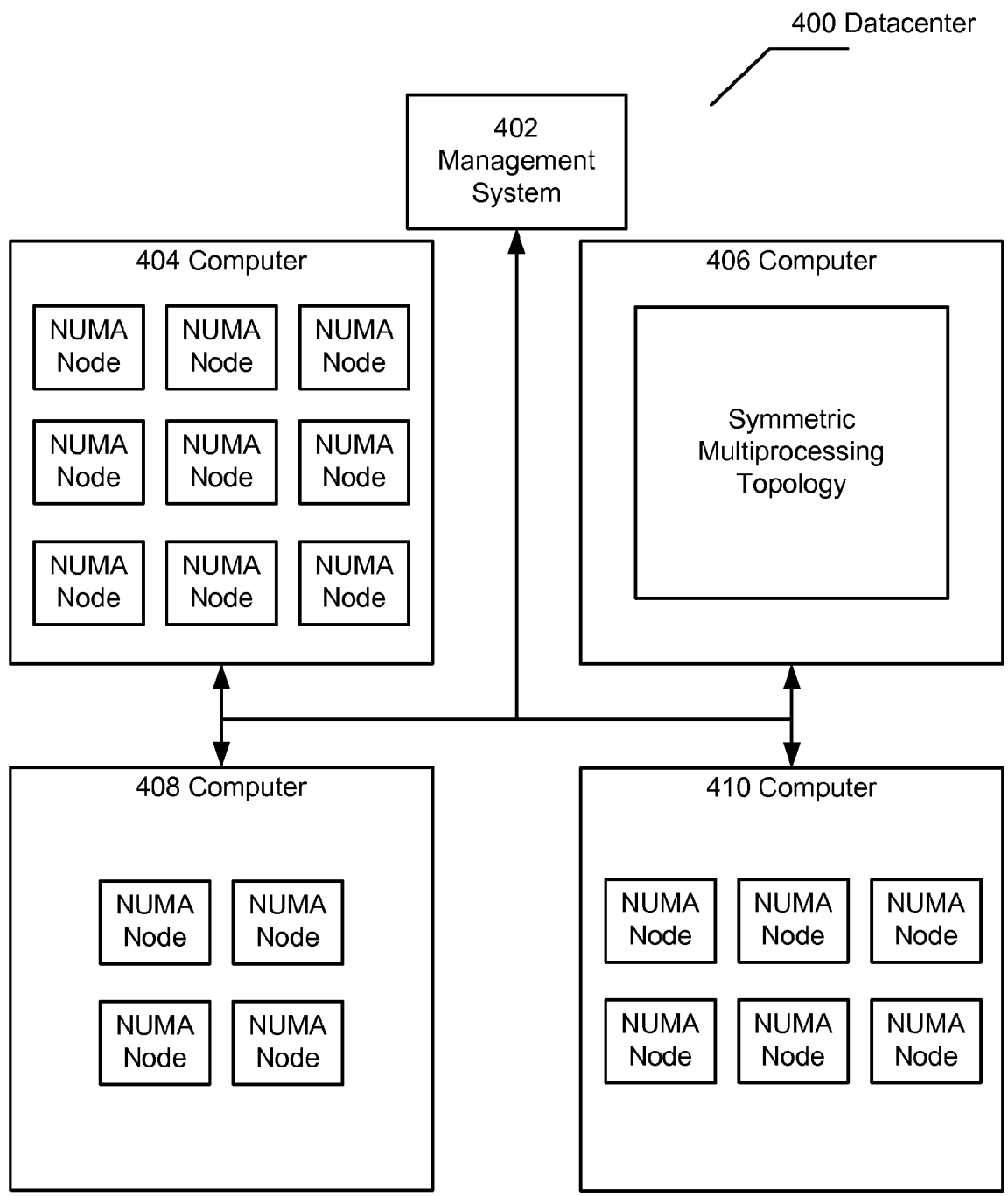
FIG. 4 illustrates a datacenter used to illustrate embodiments of the present disclosure.

FIG. 4 depicts an operational environment for practicing aspects of the present disclosure. For example, a number of computer systems 404-410 can be coupled together in a datacenter 400 (while four computer systems are depicted, one of skill in the art can appreciate that datacenter 400 can include more or fewer computer systems). The depicted computer systems can have different topologies and, moreover, they can have different characteristics, e.g., different amounts of RAM, different RAM speeds, different amounts of logical processors, and/or logical processors with different speeds or instruction sets.

As shown by FIG. 4, computer system 406 has a symmetric multiprocessing topology (SMP) or 'flat' topology. Generally, SMP is a computer architecture that includes a plurality of processors that are connected to a single shared memory. In this arrangement, a memory controller can manage the flow of data to and from memory. Memory access may be uniform with respect to each logical processor and each logical processor can access the entire range of memory, i.e., system physical addresses. This topology works well for computer systems with a relatively small number of processors, but when the computer system includes many processors, all competing for access to the shared memory bus, performance of the system can decrease. Moreover, the complexity of the computer system significantly increases, which then drives the price per processor up.

Computer systems 404, 408, and 410 have NUMA nodes. NUMA based computer systems can be generally thought of as computers that are made up of smaller computer systems. In this example, each NUMA node can include one or more logical processors and local memory. The memory inside of a NUMA node is considered local memory; memory in other NUMA nodes is considered remote memory because only processors within a NUMA node are connected with the same memory bus. The NUMA nodes are interconnected by cache coherency domain interconnects that allow processors in one NUMA node to access memory in other NUMA nodes in a coherent way. Thus, system physical addresses are uniform with respect to each processor. Or put another way, system physical address 20,000 is the same for every processor in the computer system. The difference is that for some processors, memory address 20,000 is a local memory address, e.g., inside their NUMA node, and for other processors memory address 20,000 is remote, e.g., outside their NUMA node. Generally, local memory can be accessed faster than remote memory and the relationship between local versus remote access time is called a NUMA ratio. A NUMA ratio of 1 to 2 means that it costs twice as many processor cycles to access a particular remote system physical address than a local system physical address. NUMA alleviates bottlenecks caused by SMP systems by limiting the number of processors on any one memory bus and is generally less expensive than a SMP computer system with the same amount of logical processors.

Figure 5:
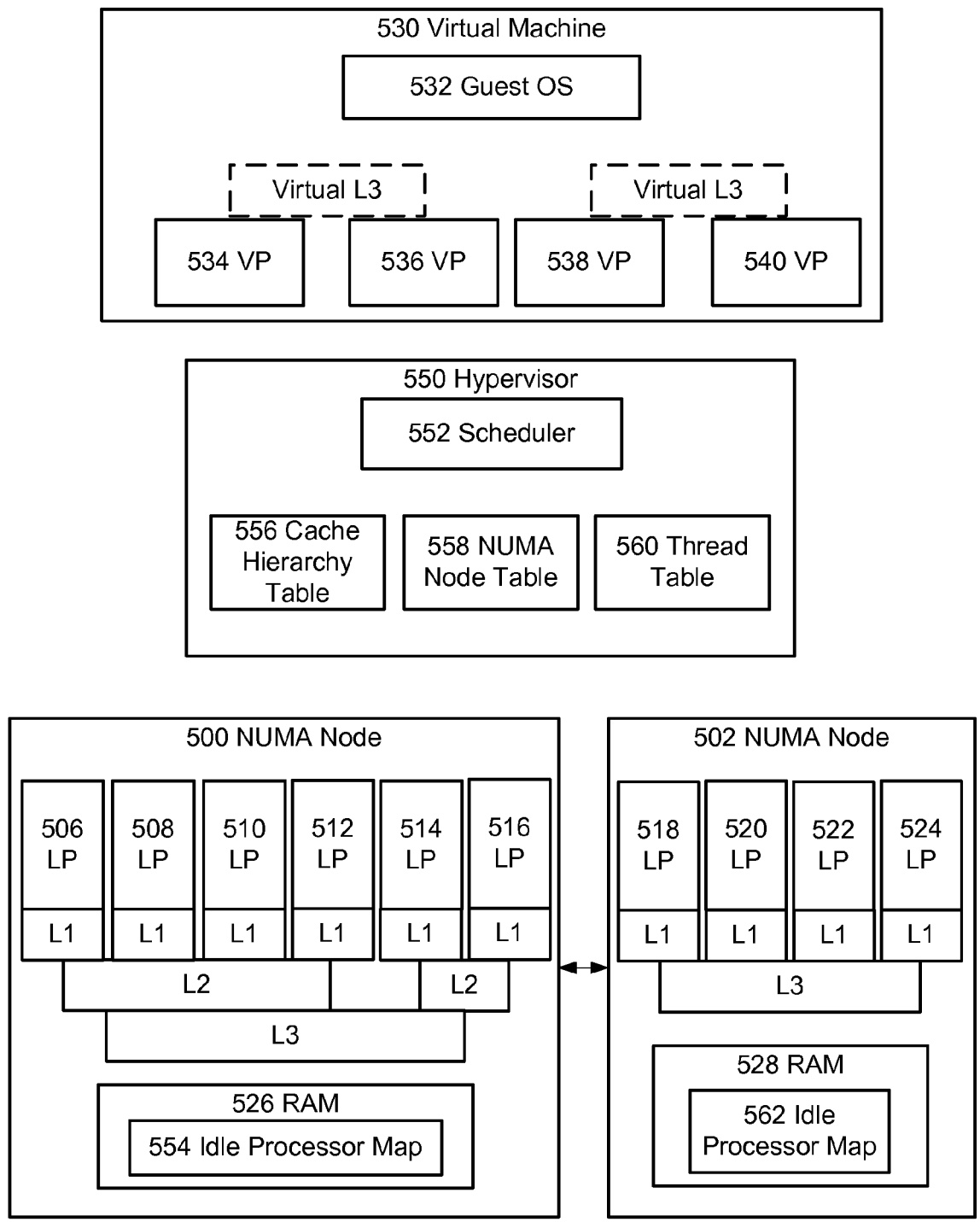
FIG. 5 depicts an operational environment for practicing aspects of the present disclosure.

FIG. 5 illustrates an operational environment for practicing aspects of the present disclosure. As one skilled in the art can appreciate, the present disclosure is not limited to the illustrated operational environment. Instead, the environment is merely an example used to illustrate concepts. Accordingly, aspects of the present disclosure can be incorporated into different environments including different amounts of NUMA nodes, virtual machines, cache topologies, logical processors, etc.

FIG. 5 shows two example NUMA nodes (500 and 502) connected by a cache coherency domain interconnect. The illustrated NUMA nodes have different cache topologies. For example, each processor in NUMA node 500 shares level 3 ("L3") cache and two groups of processors share level 2 ("L2") cache. Each processor (506-516) is shown with its own level 1 ("L1") cache. Logical processors (518-524) in NUMA node 502 share a level 3 cache and have their own level 1 cache. Those of skill in the art can appreciate that the illustrated cache topologies are for illustration purposes only and the disclosure is not limited to any particular cache topology. Each NUMA node (500 and 502) is also shown as including its own random access memory (526 and 528).

Processor cache is typically used for temporary storage of instructions and data herein referred to as information. When a request is made, a logical processor requires instructions for executing that request. Since the logical processor operates at speeds greater than RAM, high speed caches have been added to processors and algorithms have been devised to anticipate what information the logical processor will need and attempt to store the information in caches. Typically, L1 cache is very small, which allows it to be very fast, having latency times of, for example, two cycles, i.e., the number of processor cycles needed to access the memory and retrieve the information. If the information is not present in L1 cache, the logical processor checks its L2 cache, which is a slightly larger pool of memory with a little longer latency of around nine cycles. If the data is not in L2 or L1, the logical processor checks L3 cache. L3 cache is far larger than L1 and L2 and its latency is, for example, twenty three cycles. With each cache miss, the logical processor looks to its next level of cache until it fetches the information from mass storage.

Hypervisor 550, i.e., microkernel hypervisor 202 of FIG. 2 or hypervisor 304 of FIG. 3, can include scheduler 552 and can be configured to schedule threads indicative of virtual processors to run on one of the logical processors (506-516 or 518-524). In order to determine how to schedule an incoming thread, hypervisor scheduler 552 can access various information (554-562) described in more detail below.

Thread table 560 can store information about the different virtual processor threads. When a request to run a virtual processor is received, scheduler 552 can access thread table 560 and retrieve information about the virtual processor in order to determine where and how to schedule it. For each virtual processor, thread table 560 may store, for example, a timestamp identifying when the thread last ran, whether the thread has been identified to be a latency sensitive thread, the logical processor the thread last ran on, the identity of an ideal processor for the thread, the NUMA node the thread last ran in, information that describes the identity of related virtual processor threads, etc.

In an embodiment of the present disclosure, thread table 560 can be used by scheduler 552 to schedule virtual processor threads based on the identity of the last NUMA node that ran the thread. For example, scheduler 552 can be configured to select an idle processor to run an incoming thread that is located within a seed NUMA node, e.g., an ideal NUMA node (one that has been set) or the NUMA node that last ran the thread. In this example embodiment, scheduler 552 can check thread table 560 to determine the seed NUMA node for an incoming thread request and schedule the thread on the seed NUMA node.

In a specific example, each NUMA node can maintain a per-NUMA node idle processor map (554 and 562). For example, an idle processor map can be a bitmap where each bit represents a logical processor. When a logical processor runs a thread, it can set the bit and when it finishes running the thread, it can reset the bit. The idle processor map can be used by scheduler 552 to determine which logical processors are idle. In an example embodiment of the present disclosure, the bitmap can be broken into multiple maps: one for each NUMA node in the computer system stored in the NUMA node. This embodiment reduces the collisions on the map because it reduces the number of processors attempting to access the same memory to set and reset bits.

Moreover, by maintaining a map for each NUMA node, scheduler 552 can quickly remove logical processors from a list of candidates by checking the idle processor map associated with a specific NUMA node. For example, an incoming thread may have its seed NUMA node set as NUMA node 500 in thread table 560, i.e., the thread may have last ran on that node or the node is set as its ideal node. Scheduler 552 can receive this information and search idle processor map 554 for an idle processor. In this example scheduler 552 eliminated logical processors 518-524 from a list of candidates without having to access idle processor map 562 or process any information in it.

In the event that the seed NUMA node does not have an idle processor, scheduler 552 can be configured to search for an idle processor from the next closest NUMA node by accessing information in NUMA node table 558. For example, NUMA node table 558 can include a node distance graph for each NUMA node in the computer system. Hypervisor 550 can generate an array that ranks the NUMA nodes according to distance. For example, the graph for NUMA node 500 would show that NUMA node 502 is close. Hypervisor 550 can generate the graph for each NUMA node when the host system boots. For example, hypervisor 550 can direct each logical processor in a NUMA node to access RAM from all the other nodes in the host and record the round trip times and rank the times from best to worst; the best time indicating the closest node and the worst time indicating the farthest node.

Once a NUMA node is selected by scheduler 552, various algorithms can be used to select a specific logical processor. In a simple example embodiment, one where the virtual machine has one virtual processor, scheduler 552 can determine the seed logical processor for a thread and if that thread is unavailable, scheduler 552 can access a cache hierarchy table 556 to determine where to schedule the thread. Cache hierarchy table 556 can include an array of bitmaps for each logical processor that describes how it shares caches with other logical processors in its NUMA node. For example, logical processor 506 may have three arrays: an array for L1 that has a bit set for logical processor (LP) 506 and nulls for LPs 508-516, an array for L2 that has a bit set for LPs 506-512, and an array for L3 that shows bits set for LPs 506-516. In an example embodiment, scheduler 552 can be configured to select an idle logical processor that shares a highest level of cache with the seed. For example, if the seed is LP 506 scheduler 552 could select LP 508, LP 510, or LP 512 if any is idle since L2 is the highest cache these processors share.

In an example embodiment, the seed logical processor can be set to the last processor that ran the thread. For example, if a virtual machine includes one logical processor, it most efficiently runs on the logical processor that last ran it because this logical processor has the highest chance of having information the virtual processor needs in its cache. In this example embodiment, as the virtual processor is moved, the seed can be changed to the logical processor that last ran it.

The complexity of the scheduling algorithm can increase as the number of virtual processors assigned to a virtual machine increases. For example, when a virtual machine includes multiple virtual processors, it has been noted that the virtual processors tend to use the same information. Thus, if the virtual processors are scheduled on logical processors that share caches, the number of cache hits increases, which causes the guest to run more efficiently. In this example embodiment, scheduler 552 can select logical processors to run virtual processors of a virtual machine in such a way that the virtual processors share physical caches. This technique reduces the chance that cache misses occur and in the event that one does occur, the information fetched for one virtual processor can be used by the other virtual processors.

In an example embodiment where multiple virtual processors are executing within a virtual machine, each virtual processor can be assigned a seed logical processor set by an administrator or configuration program. For example, virtual processor 534 could have LP 506 set as its ideal logical processor and virtual processor (VP) 536 could have LP 508 set as its ideal logical processor. When scheduler 552 attempts to schedule VP 534, scheduler 552 will determine that its ideal logical processor is LP 506 and will attempt to schedule it on LP 506. Since scheduler 552 is attempting to keep threads on their ideal logical processors, the number of cache hits will be increased.

In another example embodiment, scheduler 552 may not use a seed. Instead, scheduler 552 can select an idle logical processor based on the location of threads of other virtual processors in a virtual machine such as virtual machine 530. In this example embodiment, scheduler 552 can be configured to select a logical processor that it estimates will have the smallest estimated miss cost. A cache miss occurs when a logical processor attempts to access information from a cache and the information is not in cache. The miss cost is the amount of cycles that would be wasted if information is not in cache. In this example embodiment, scheduler 552 can select the logical processor that has the lowest estimated miss cost.

For example, scheduler 552 can be configured to select an idle processor that shares cache with a maximum number of logical processors currently running virtual processors of a virtual machine. In the same or another example embodiment, scheduler 552 can be configured to select an idle processor that shares a maximum number of caches with a maximum number of logical processors currently running virtual processors of a virtual machine. For example, and referring to FIG. 5, in an embodiment, virtual processor 534 may be running on LP 506, virtual processor 536 may be running on LP 508 and virtual processor 538 may be running on LP 514. In this example, scheduler 552 may receive a request to run virtual processor 540. Scheduler 552 can check idle processor map 554 and determine that LPs 510, 512, and 516 are free. In this example, scheduler 552 can access cache hierarchy table 556 and obtain the arrays for LPs 510, 512, and 516. Scheduler 552 can determine, based on the arrays, that LPs 510, 512, and 516 each share L3 cache with LP 506, LP 508, and LP 514. In the first example above, scheduler 552 may select either LP 510, LP 512 or LP 516. In the alternative embodiment described above, scheduler 552 can select LP 510 or LP 512 because they share L2 cache with LP 506 and LP 508 as well as L3 cache with LP 506, LP 508, and LP 514. In this example, LPs 510 and 512 each share two cache levels (L2 and L3) with LPs 506 and 508, whereas LP 516 only shares one cache level (L3) with LPs 506 and 508.

In another example embodiment, scheduler 552 can be configured to handle latency sensitive workloads differently than regular workloads when scheduling. Typically virtual processors belonging to latency sensitive guests are scheduled as soon as possible. However, in this case, if the last logical processor a virtual processor ran on is unavailable, the virtual processor would be migrated elsewhere and the positive effects of having cache hits would be lost. In an example embodiment, scheduler 552 can be configured to maximize locality while simultaneously limited latency without affecting non-latency sensitive workloads.

For example, when hypervisor 550 receives a request to schedule a latency sensitive thread, scheduler 552 can determine if there are any logical processors that share cache with the last logical processor that ran the thread and select one. For example, the selected logical processor could be the logical processor that shares the highest level of cache with the processor that last ran the thread. If no logical processors that share cache are available, scheduler 552 can determine the amount of time since the virtual processor last ran and compare it to a predetermined threshold. If the amount of time since it is last ran is greater than the threshold, the virtual processor can be migrated, otherwise, it can be queued to run on the logical processor that last ran the thread. If the amount of time since the virtual processor last ran is greater than the threshold, it is assumed that useful information is no longer in cache. If the amount of time since it last ran is less than the threshold, the assumption is that cache still contains useful information. One skilled in the art can appreciate that the predetermined threshold can be set by a policy or an administrator and is dependent on the physical hardware and workload characteristics of the virtual machine. Over time, an administrator or policy can adjust the predetermined threshold and monitor how efficiency increases or decreases until an optimum value is found for a particular host running a particular workload.

Continuing with the description of FIG. 5, in an embodiment, a virtual cache topology can be exposed to virtual machines. In this example embodiment, hypervisor 550 can calculate or receive a virtualized topology that can be exposed to the guest. Hypervisor 550 can construct a topology that can be reasonably honored by the host computer system and, for example, any other computer system in a datacenter. This allows for a scheduler in the guest operating system to make intelligent scheduling decisions while maintaining the abstraction between hardware and virtual hardware.

For example, in an embodiment where virtualized cache topology is exposed to guest operating system 532, hypervisor 550 can detect the cache topology of the host computer system during boot. For hypervisor 550 to detect the cache topology of the host computer, the parent partition 204 queries its corresponding physical cache topology. Hypervisor 550 responds either through vendor specific mechanisms or through a hypercall. In an example embodiment where the host is by itself, hypervisor 550 can be configured to calculate a virtual cache topology that can be honored by at least most of the logical processors in the computer system. In a datacenter example, the host computer and all of the other computers in the datacenter, via their respective parent partitions, can each expose their physical cache topology to management system 402. Management system 402 can then calculate, using various algorithms, a virtual cache topology that can be honored by at least most of the computer systems. The topology can be received by hypervisor 550 from management system 402, and hypervisor 550 can effectuate a virtual machine having the topology.

In alternative embodiments, the management system 402 may be directed internally or by an administrator to (1) disregard certain systems and/or cache hierarchies, (2) use an alternate formula, (3) accept a sharing level, (4) accept a sharing cardinality, or (5) accept both a sharing cardinality and a sharing level.

In a specific example embodiment, hypervisor 550 or management system 402 can calculate a virtual cache topology. For example, hypervisor 550 or management system 402 can calculate a virtual cache topology by determining an amount of logical processors shared by a cache by using one of two methods of calculation (sharing cardinality); expose the sharing cardinality to a guest operating system; and expose a cache interconnecting the determined number that is the highest level of cache that can be honored (sharing level) to a guest operating system.

In one method of calculating sharing cardinality, the sharing cardinality is the minimum number of LPs sharing the lowest level of cache in each cluster. For example, and referring to FIG. 5, in the illustrated embodiment, hypervisor 550 could detect that six LPs in NUMA node 500 and four LPs in NUMA node 502 share the lowest level cache (L3) shared in the cluster. Hypervisor 550 (or in a datacenter example, the management system 402) then determines that the minimum amount of logical processors that share the lowest level of cache in the cluster is four, e.g., LPs 518-524 share L3. In this example, hypervisor 550 can select L3 as the type of cache to expose because hypervisor 550 (or management system 402) determines the sharing level as the highest level of cache at which there are at least sharing cardinality number of cache sharing LPs. Thus, as illustrated by FIG. 5, in this example, hypervisor 550 can expose groups of four virtual processors that share a virtual L3 cache. Hypervisor 550 can then store the information in cache hierarchy table 556.

In another method of calculating sharing cardinality, the sharing cardinality is the greatest common divisor of each cluster's numbers of LPs sharing the lowest level of cache in each cluster. For example, and referring to FIG. 5, in the illustrated embodiment, hypervisor 550 could detect the numbers of logical processors that as a group share the lowest level of cache in the cluster. In this example, using FIG. 5, in NUMA node 500, six LPs (LPs 506-516) share the lowest level cache, L3, and in NUMA node 502, four LPs (LPs 518-524) share the lowest level cache, L3. Hypervisor 550 (or in a datacenter example, the management system 402) then determines that the greatest common divisor of the two groups, six processors and four processors, is two processors. Hypervisor 550 (or management system 402) then determines that the highest level of cache in the cluster at which there are at least the determined number of processors (two in this example) is L3. In this example, hypervisor 550 can select L3 as the type of cache to expose. Thus, as illustrated by FIG. 5, in this example, hypervisor 550 can expose groups of two virtual processors that share a virtual L3 cache. Hypervisor 550 can then store the information in cache hierarchy table 556.

After the virtual cache topology is determined (and passed by management system 402 to hypervisor 550, in the case of a datacenter), it can be used by scheduler 552 when scheduling threads. In one embodiment, hypervisor 550 can set distinct logical processors for virtual processors in a way that honors the virtual cache topology. Hypervisor 550 attempts to assign each virtual processor a distinct logical processor such that there is a one-to-one correspondence between virtual processors and logical processors. The distinct logical processors may be divided into sets such that the number of distinct logical processors in each set shares cache at the sharing level, where the number of distinct logical processors in each set is the lesser of sharing cardinality and the number of virtual processors. For example, and continuing the specific example from above, when the sharing cardinality is four, the sharing level is L3, and the number of virtual processors is four, hypervisor 550 may set LP 506 as the distinct logical processor for VP 534, LP 508 as the distinct logical processor for VP 536, LP 510 as the distinct logical processor for VP 538, and LP 512 as the distinct logical processor for VP 540. Hypervisor 550 can then expose L2 cache between LPs 506, 508, 510, and 512 as a virtual L3 cache. In this example embodiment, as long as scheduler 552 can schedule VP 534, VP 536, VP 538, and VP 540 on any combination of logical processors in NUMA node 500 or NUMA node 502, the virtualized cache topology is honored. Moreover, if the physical cache being virtualized is an L2, guest operating system 532 may observe a performance increase.

In another embodiment, if the number of VPs is not exactly divisible by the sharing cardinality, then one set need only share the remainder value (modulo) of logical processors at the sharing level.

If hypervisor 550 cannot honor the virtual cache topology because, for example, the physical cache topology has changed or management system 402 was directed to use a sharing cardinality and/or sharing level that cannot be mapped appropriately, the hypervisor 550 may attempt a best fit by first iteratively decreasing the cache level that logical processors are mapped to then iteratively decreasing the sharing cardinality number. This does not modify the virtual cache topology, only the mapping to the logical processors.

In another example embodiment, hypervisor 550 can keep track of where virtual processors are executing and select a logical processor based on the exposed virtual topology and estimated cache miss cost associated with the available logical processors. Scheduler 552 can then determine the identities of the logical processors running other threads of virtual machine 530 and use this information to select a logical processor that honors the virtual cache topology and has the lowest estimated miss cost.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 6:
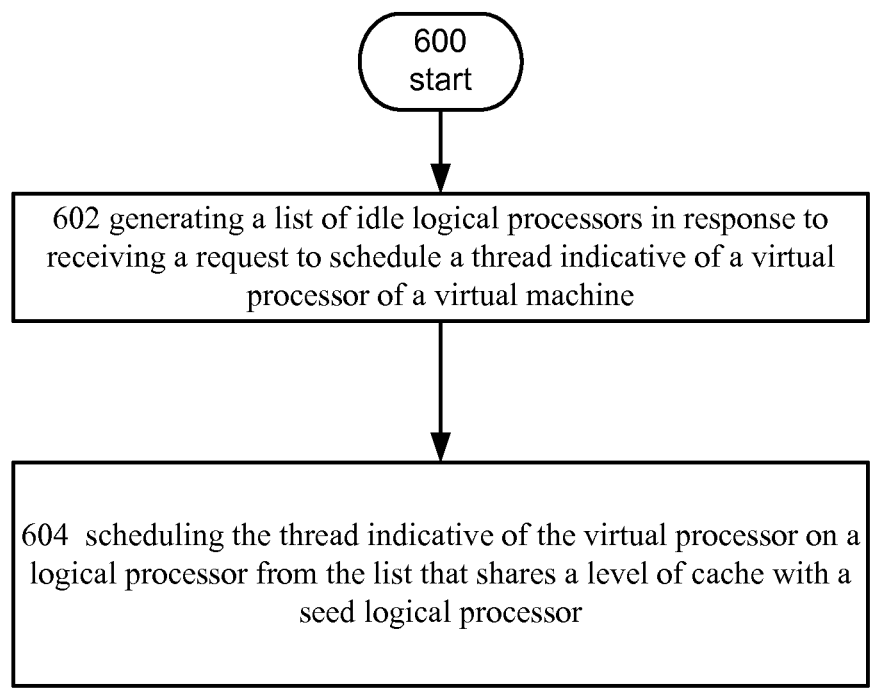
FIG. 6 depicts operational procedure for practicing aspects of the present disclosure.

FIG. 6 illustrates an operational procedure for practicing aspects of the present disclosure including operations 600, 602, and 604. Operation 600 begins the operational process and operation 602 illustrates generating a list of idle logical processors in response to receiving a request to schedule a thread indicative of a virtual processor of a virtual machine. For example, and referring to FIG. 5, hypervisor 550 can be configured to instantiate and control virtual machine 530 and expose one or more virtual processors such as VP 534-VP540 to guest operating system 532. In an example embodiment, virtual processors 534-540 may be single core virtual processors. Or put another way, a virtualized cache topology may not be exposed to guest operating system 532. In this example, guest operating system 532 may schedule a thread on virtual processor 534 and hypervisor 550 can receive a request to schedule virtual processor 534 on a logical processor. In response to receiving the request, scheduler 552 can execute and generate a list of idle logical processors. In an example embodiment, scheduler 552 could check an idle processor map and determine which processors in the system are idle.

Operation 604 shows scheduling the thread indicative of the virtual processor on a logical processor from the list that shares a level of cache with a seed logical processor. Continuing with the example above, scheduler 552 can execute and schedule the thread on a logical processor that shares a level of cache with a seed logical processor. For example, in this example embodiment, scheduler 552 can attempt to schedule the thread on a logical processor that is close to a seed logical processor. In this way, scheduler 552 can increase performance of virtual machine 530 by increasing the chance that the thread will use data or instructions that are in the shared cache and the logical processor can run without having to fetch data or instructions from RAM or another NUMA node.

Continuing from the specific example above, scheduler 552 can determine that the seed for thread indicative of virtual processor 534 is logical processor 506. In the event that logical processor 506 is unavailable, scheduler 552 can then be configured to access cache hierarchy table 556 and determine which idle logical processors share cache with logical processor 506. Scheduler 552 can then be configured to select one of the logical processors that shares cache to run thread indicative of VP 534. For example, LP 508 and LP 514 may be idle. Scheduler 552 can access cache hierarchy table 556 and determine LP 508 shares L2 and L3 with LP 506 and LP 506 shares L3 cache with LP 514. Scheduler 552 can then select one of the logical processors to run the thread.

Figure 7:
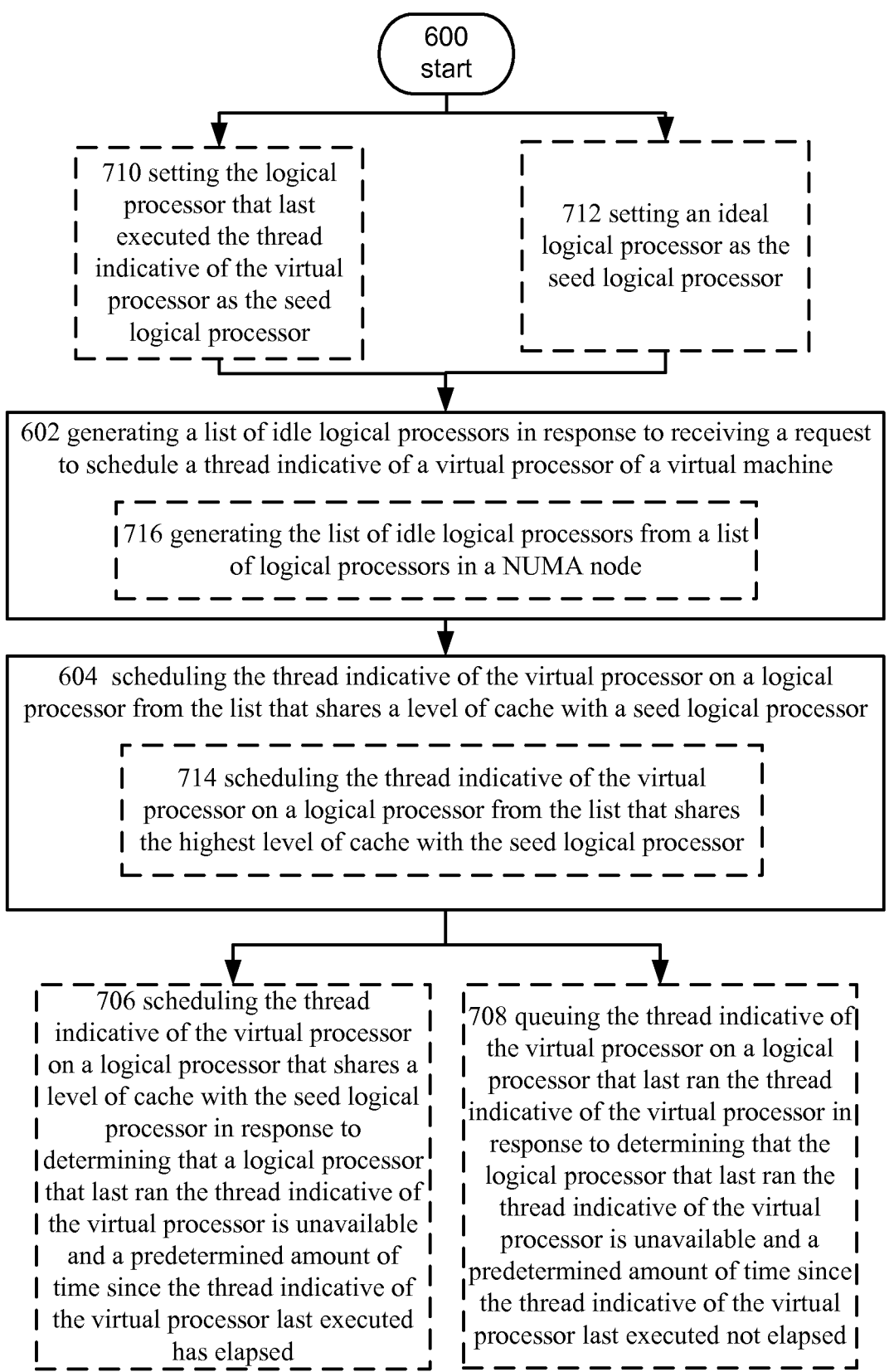
FIG. 7 depicts an alternative embodiment of the operational procedure of FIG. 6.

FIG. 7 illustrates an alternative embodiment of the operational procedure of FIG. 6, including the additional operations 706-716. Operation 706 shows scheduling the thread indicative of the virtual processor on a logical processor that shares a level of cache with the seed logical processor in response to determining that a logical processor that last ran the thread indicative of the virtual processor is unavailable and a predetermined amount of time since the thread indicative of the virtual processor last executed has elapsed. For example, in an embodiment, scheduler 552 may determine that the thread indicative of virtual processor 534 is associated with a latency sensitive workload. That is, the workload, e.g., the programs executed by guest operating system 532, may need to be scheduled as soon as possible when it is received by scheduler 552. For example, hypervisor 550 may obtain performance information from guest 532 indicating that its performance is sluggish or guest operating system 532 is performing a lot of network based input/output work. In another embodiment, an administrator or policy could set threads from virtual machine 530 as latency sensitive. Regardless of how the thread is identified as latency sensitive, scheduler 552 can obtain information from thread table 560 when a request to schedule thread indicative of virtual processor 534 is received and determine how to schedule it.

In an example embodiment, scheduler 552 can immediately schedule the thread or queue it, depending on when the thread last ran. For example, if the thread recently ran, there is a chance that information it would use is still in cache. In this case, the decrease in performance due to queuing may be less than the increase in performance gained by having cache hits. Alternatively, if thread has not run recently, then the cache may be cold, i.e., may not have any useful information, and no performance benefits may be obtained by waiting any longer.

In this example embodiment, a predetermined threshold time can be used to determine that the thread should be run. For example, scheduler 552 can receive a request to schedule virtual processor 534. Scheduler 552 can run and access thread table 560 to obtain information regarding VP 534 such as information that describes that the thread is latency sensitive, a time that thread last ran, and the logical processor that last ran thread 534. Scheduler 552 can access an idle processor map and check to see which logical processors are available. In this specific example, the logical processor that last ran the thread, e.g., LP 506, may be unavailable. In this situation, scheduler 552 can compare the amount of time since VP 534 last ran to a predetermined threshold and determine that the amount of time since it last ran is greater than the predetermined value. Schedule 552 can be scheduled to access cache hierarchy table 556 and determine which available logical processors share cache with LP 506 and select one to run thread 534.

Continuing with the description of FIG. 7, operation 708 shows queuing the thread indicative of the virtual processor on a logical processor that last ran the thread indicative of the virtual processor in response to determining that the logical processor that last ran the thread indicative of the virtual processor is unavailable and a predetermined amount of time since the thread indicative of the virtual processor last executed not elapsed. Similar to operation 706, in an embodiment, thread indicative of VP 534 could be a latency sensitive thread. In this example, scheduler 552 can be configured to queue thread 534 on LP 506 in the instance that LP 506 is unavailable and the predetermined amount of time has not elapsed. In this example, a decision can be made that the savings due to having cache hits will offset the fact that the latency sensitive thread is not executed as soon as possible. As stated above, the predetermined threshold can be set based on performance characteristics of the system and may be adjusted by an administrator or a policy.

Operation 710 of FIG. 7 shows setting the logical processor that last executed the thread indicative of the virtual processor as the seed logical processor. For example, in an embodiment, an administrator or a policy can be used by hypervisor 550 to set a seed logical processor for a virtual processor. In this specific example, the logical processor that last ran VP 534 can be set as the seed. Thus, in this example embodiment, if thread 534 is moved from LP 506 to LP 508, the seed can be changed in thread table 560 to reflect that the seed is now LP 508. In this example embodiment, virtual machine 530 may be a single core virtual machine 530 and the only efficiency that can be obtained from cache hits is from configuring VP 534 to share as many caches with the logical processor that last ran it.

Operation 712 shows setting an ideal logical processor as the seed logical processor. For example, and referring to FIG. 5, in an example embodiment, an ideal logical processor can be set as the seed. In this example, the seed could be statically assigned at boot based on a policy or by an administrator and can remain constant even if threads indicative of virtual processors are moved by scheduler 552. For example, virtual machine 530 can be instantiated. A policy could be read by hypervisor 550 that directs it to set ideal processors for VPs 534-540. In response, hypervisor 550 can assign LP 506 as the ideal for VP 534, LP 508 as the ideal for VP 536 and so on and so forth. This information can then be recorded in thread table 560. In the event that VP 534 is moved, the next time it runs, scheduler 552 can be configured to access thread table 560; determine that LP 506 is set as an ideal logical processor; and check to see if LP 506 is free. In this example, if LP 506 is free, it is scheduled thereon, regardless of the identity of the last logical processor that ran VP 534, and if it is unavailable, scheduler 552 attempts to locate it as close as possible to the ideal logical processor.

Operation 714 shows scheduling the thread indicative of the virtual processor on a logical processor from the list that shares the highest level of cache with the seed logical processor. For example, in an embodiment, scheduler 552 can be configured to attempt to collocate virtual processors such that they share the highest level of cache. In this example embodiment, guest 532 has the best chance of seeing a performance increase due to cache hits. As described above, each logical processor can have arrays associated therewith stored in cache hierarchy table 556. In response to receiving a request to schedule a thread indicative of a virtual processor, such as VP 534, scheduler 552 can determine the seed for VP 534 and access cache hierarchy table 556 to determine the available logical processor that shares the highest level of cache with the seed. Scheduler 552 can then schedule the thread on an available logical processor that shares the highest level of cache with the seed.

Operation 716 shows generating the list of idle logical processors from a list of logical processors in a NUMA node. Hypervisor 550 can be configured to maintain idle processor maps for each NUMA node in the computer system. In this example embodiment, each virtual processor could be assigned an ideal NUMA node when virtual machine 530 is started and this information could be stored in thread table 560. When scheduler 552 runs, it can determine that a thread has been assigned an ideal NUMA node and scheduler 552 can generate the list of idle processors from an idle processor map associated with the ideal NUMA node. In this way, the initial set of possible logical processor candidates is reduced. In a specific example, NUMA node 500 could be the ideal NUMA node for thread indicative of virtual processor 534. Scheduler 552 can obtain this information from thread table 560; access idle processor map 554; and generate a list of idle processors in NUMA node 500.

Figure 8:
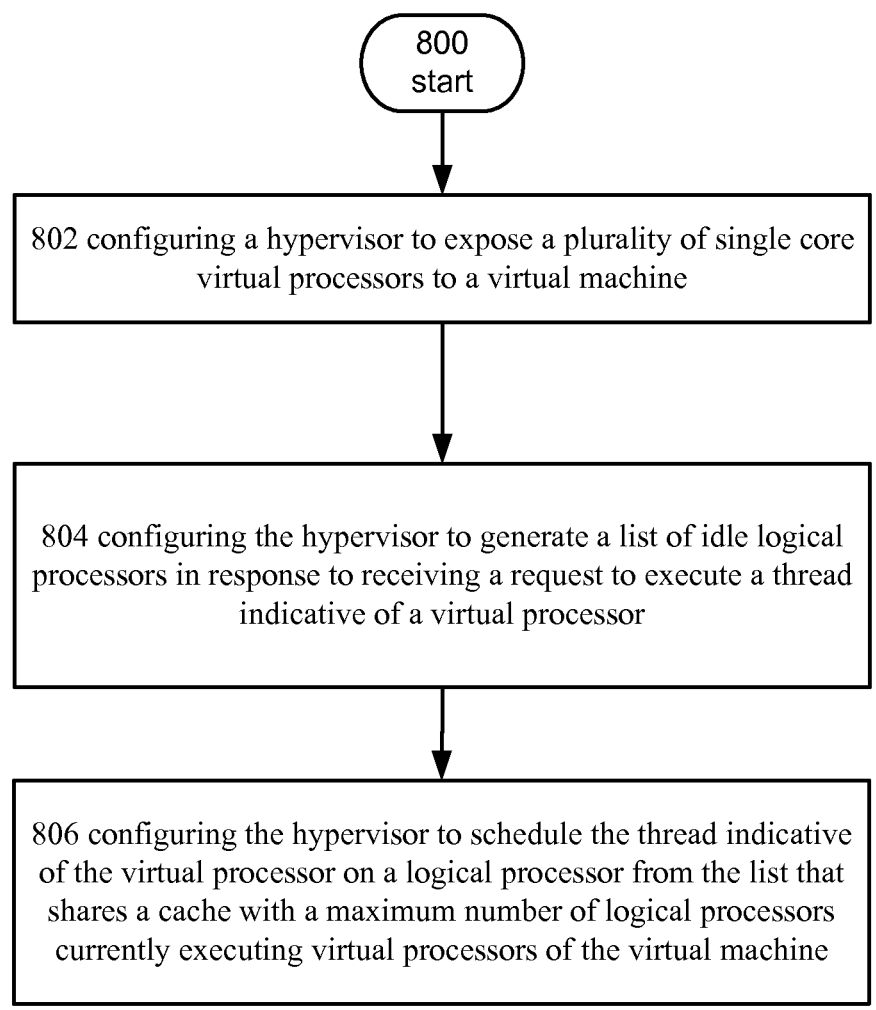
FIG. 8 depicts operational procedure for practicing aspects of the present disclosure.

FIG. 8 illustrates an operational procedure for practicing aspects of the present disclosure including operations 800, 802, 804, and 806. Operation 800 begins the operational procedure and operation 802 shows configuring a hypervisor to expose a plurality of single core virtual processors to a virtual machine. For example, and referring to FIG. 5, in an embodiment, a computer system can execute instructions indicative of hypervisor 550 and can load instructions operable to instantiate virtual machine 530. For example, hypervisor 550 can set up virtual machine 530 to include a plurality of virtual processors such as virtual processors 534-540. In this example embodiment, the virtual processors can be single core virtual processors. Put another way, the virtual processors 534-540 may not share caches. Guest operating system 532 can boot and detect the single core virtual processors.

Continuing with the description of FIG. 8, operation 804 shows configuring the hypervisor to generate a list of idle logical processors in response to receiving a request to execute a thread indicative of a virtual processor. For example, an executing instance of hypervisor 550 can be set to generate a list of idle logical processors in the event that it receives a request to schedule a thread indicative of a virtual processor, such as VP 540. For example, executable instructions of scheduler 552 can be loaded into memory upon boot that set up idle processor maps for the logical processors in a computer system, and hypervisor can be configured to run scheduler 552 that can generate a list of idle logical processors in response to receiving a thread from a guest such as guest operating system 532.

Operation 806 shows configuring the hypervisor to schedule the thread indicative of the virtual processor on a logical processor from the list that shares a cache with a maximum number of logical processors currently executing virtual processors of the virtual machine. For example, and referring to FIG. 5, in an embodiment, hypervisor 550 can be configured to run scheduler 552 in response to a request to schedule a thread indicative of, for example, VP 540. In this example, scheduler 552 can check thread table 560 and determine that virtual machine 530 is not using seeds. In response to this determination, scheduler 552 can obtain information that describes where other virtual processors of virtual machine 530 are executing. For example, VP 534 can be executing on LP 514, VP 536 can be executing on LP 516, and VP 538 can be executing on LP 512. Scheduler 552 can then run and determine which logical processors are available. For example, LP 506 and LP 518 may be available. Scheduler 552 can check cache hierarchy table 556 and determine that LP 506 shares L3 cache with LP 512-516 and that LP 518 does not share any caches with LPs 512-516. In this example, scheduler 552 can schedule thread indicative of VP 540 on LP 506 because LP 506 shares cache with the maximum number of currently executing virtual processors.

Figure 9:
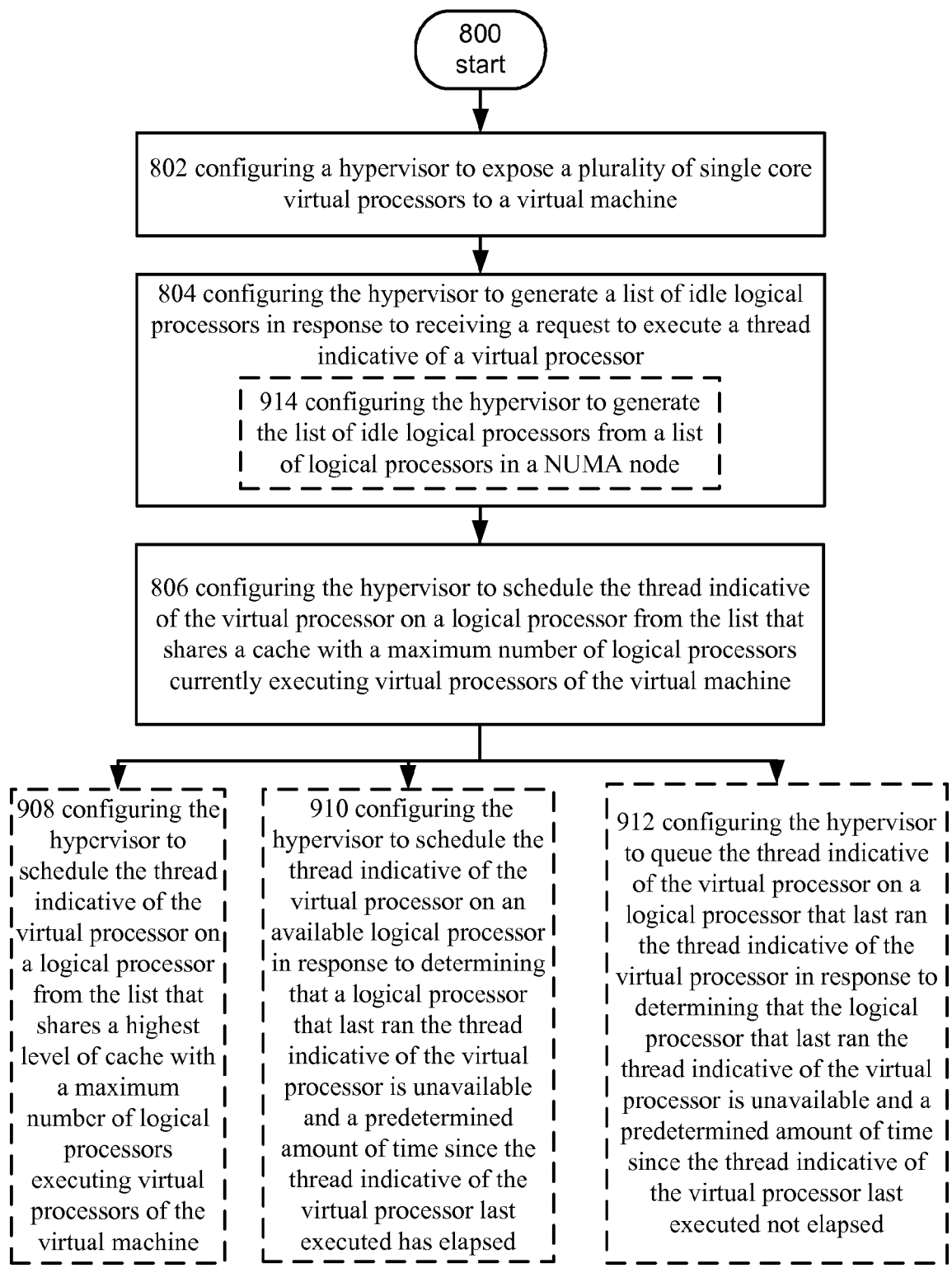
FIG. 9 depicts an alternative embodiment of the operational procedure of FIG. 8.

FIG. 9 illustrates an alternative embodiment of the operational procedure of FIG. 8, including additional operations 908-916. Operation 908 shows configuring the hypervisor to schedule the thread indicative of the virtual processor on a logical processor from the list that shares a highest level of cache with a maximum number of logical processors executing virtual processors of the virtual machine. For example, scheduler 552 can be configured to schedule the thread on a logical processor that shares a highest level of cache with a maximum amount of virtual processors currently running. For example, in an embodiment, scheduler 552 may determine that there are multiple available logical processors that share cache with a maximum number of logical processors. In this example, scheduler 552 can be configured to select the logical processor that shares the highest cache with the most logical processors. For example, in an embodiment logical processors 508-514 may be running four virtual processors of a virtual machine including five virtual processors. Scheduler 552 may determine that LP 506 and LP 516 are available and each share L3 cache with the logical processors currently running virtual processors of the virtual machine. In this example, scheduler 552 can determine that LP 506 shares L2 cache with three of the four logical processors and LP 516 shares L2 cache with one logical processor. In this example, scheduler 552 can select LP 506.

Continuing with the description of FIG. 9, operation 910 shows configuring the hypervisor to schedule the thread indicative of the virtual processor on an available logical processor in response to determining that a logical processor that last ran the thread indicative of the virtual processor is unavailable and a predetermined amount of time since the thread indicative of the virtual processor last executed has elapsed. For example, in an embodiment, scheduler 552 may determine that the thread is associated with a latency sensitive workload. That is, the workload, e.g., the programs executed by guest operating system 532, may need to be scheduled as soon as possible when it is received by scheduler 552. In this example embodiment, if a predetermined amount of time since the virtual processor last ran has elapsed, schedule 552 can be scheduled to access cache hierarchy table 556 and determine which available logical processors share cache with, for example, the logical processor that last ran it or one that shares a cache with a maximum number of logical processors currently executing virtual processors of the virtual machine.

Continuing with the description of FIG. 9, operation 912 shows configuring the hypervisor to queue the thread indicative of the virtual processor on a logical processor that last ran the thread indicative of the virtual processor in response to determining that the logical processor that last ran the thread indicative of the virtual processor is unavailable and a predetermined amount of time since the thread indicative of the virtual processor last executed not elapsed. In an embodiment, a predetermined amount of time may not have elapsed. In this example embodiment, scheduler 552 can queue the thread on the logical processor that last ran it. As stated above, the predetermined threshold can be set based on performance characteristics of the system and may be adjusted by an administrator or a policy.

Operation 914 shows configuring the hypervisor to generate the list of idle logical processors from a list of logical processors in a NUMA node. Hypervisor 550 can be configured to maintain idle processor maps for each NUMA node in the computer system. In this example embodiment, each virtual processor could be assigned an ideal NUMA node when virtual machine 530 is started and this information could be stored in thread table 560. When scheduler 552 runs, it can determine that a thread has been assigned an ideal NUMA node and scheduler 552 can generate the list of idle processors from an idle processor map associated with the ideal NUMA node. In this way, the initial set of possible logical processor candidates is reduced. In a specific example, NUMA node 500 could be the ideal NUMA node for thread indicative of VP 534. Scheduler 552 can obtain this information from thread table 560; access idle processor map 554; and generate a list of idle processors in NUMA node 500.

Figure 10:
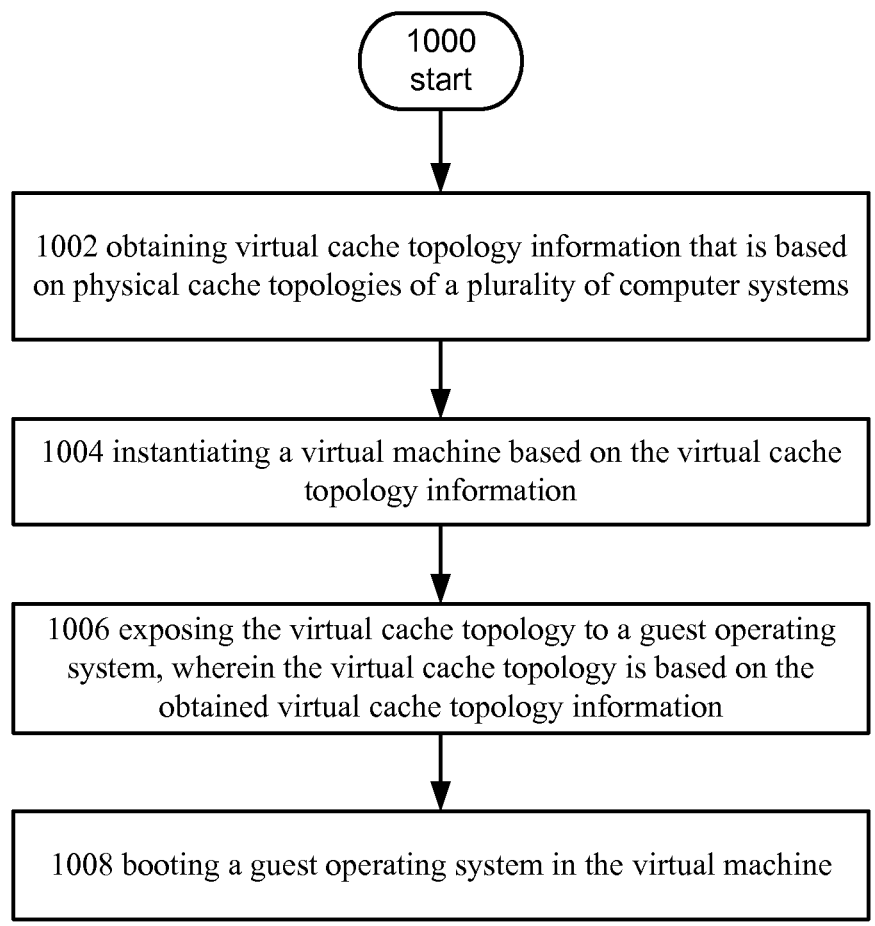
FIG. 10 depicts operational procedure for practicing aspects of the present disclosure.

FIG. 10 illustrates an operational procedure for practicing aspects of the present disclosure including operations 1000, 1002, 1004, 1006, and 1008. Operation 1000 begins the operational procedure and operation 1002 shows obtaining virtual cache topology information that is based on physical cache topologies of a plurality of computer systems. For example, and referring to FIG. 5, hypervisor 550 can obtain configuration information that describes how to generate a virtual cache topology for virtual machine 530. In an embodiment, hypervisor 550 can generate the information or, in a datacenter embodiment, it can receive the configuration information from, for example, management system 402 of FIG. 4.

Operation 1004 shows instantiating a virtual machine based on the virtual cache topology information. Hypervisor 550 can receive the configuration information and instantiate a virtual machine, such as virtual machine 530. In this example, virtual machine 530 can include the virtualized cache topology. For example, hypervisor 550 can allocate memory to virtual machine 530 and mount a virtual motherboard in the allocated RAM. Attached to the virtual motherboard can be virtual processors having the virtualized cache topology.

Operation 1006 shows exposing the virtual cache topology to a guest operating system, wherein the virtual cache topology is based on the obtained virtual cache topology information. The configuration information that is generated by hypervisor 550, or in a datacenter embodiment, received by hypervisor 550 from management system 402 that can describe a virtual cache topology can be exposed by hypervisor 550 to guest operating system 532 when the guest operating system 532 boots. Guest operating system 532 can then detect the topology and configure its scheduler to depend on it. In this example embodiment, the virtual cache topology can be independent from the physical cache topology of the host computers system so that guest operating system 532 can be easily migrated to any computer system in datacenter 400.

Operation 1008 shows booting a guest operating system in the virtual machine. For example, firmware can run and load guest operating system 532 into virtual machine 530. Guest operating system 532 can detect virtual processors and query the virtual processors to determine the virtualized cache topology. In this example, hypervisor 550 can receive the query and return virtualized results based on the configuration information that describes the virtualized cache topology. For example, virtual cache topology may include two virtual processors sharing an L3 cache. In this example, hypervisor 550 can respond to the query with information that identifies the virtualized cache topology. Guest operating system 532 can then configure its scheduler to efficiently use the virtualized cache topology.

Figure 11:
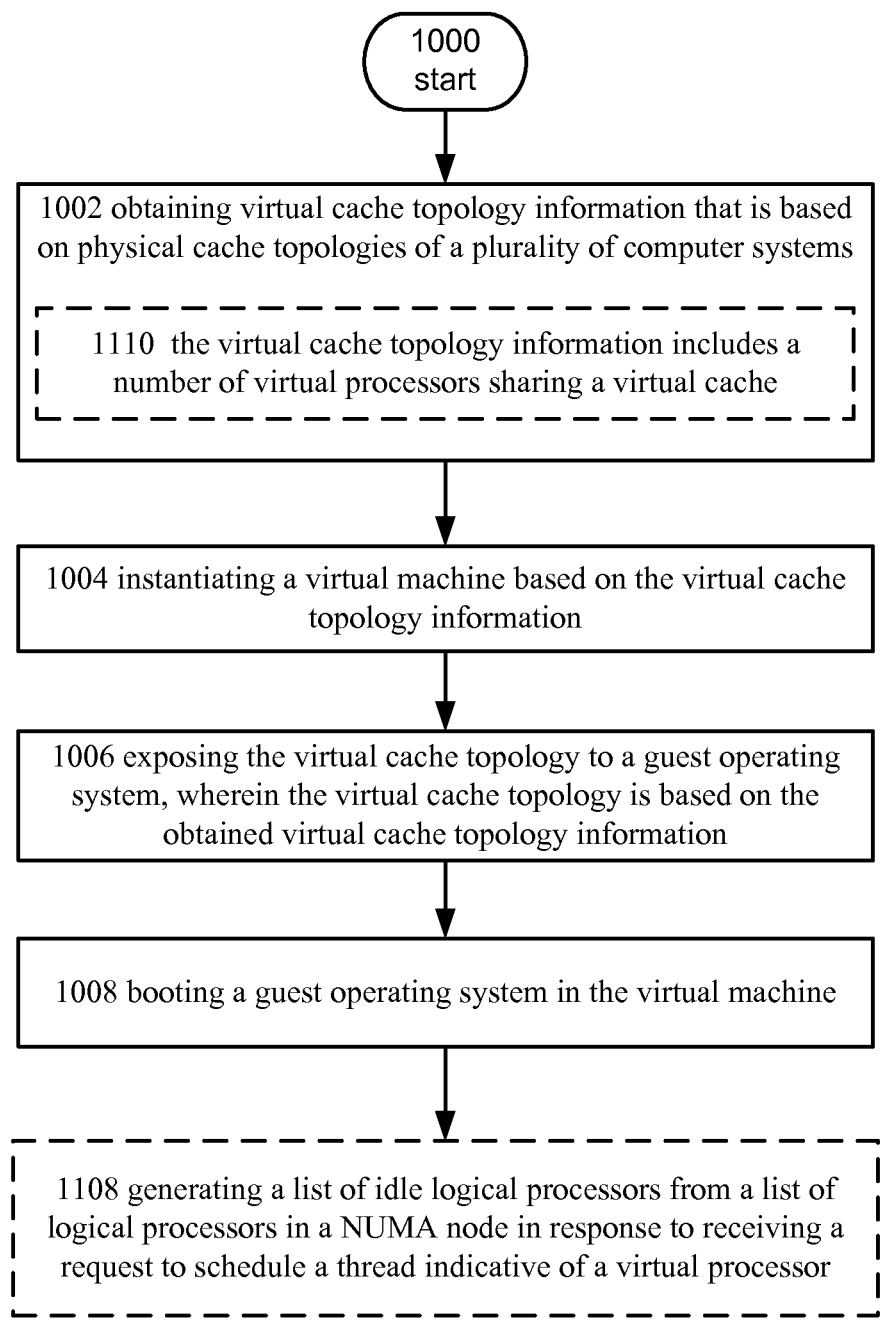
FIG. 11 depicts an alternative embodiment of the operational procedure of FIG. 10.

FIG. 11 illustrates an alternative embodiment of the operational procedure of FIG. 10, including operations 1108 and 1110. Operation 1108 shows generating a list of idle logical processors from a list of logical processors in a NUMA node in response to receiving a request to schedule a thread indicative of a virtual processor. Hypervisor 550 can be configured to maintain idle processor maps for each NUMA node in the computer system. In this example embodiment, each virtual processor could be assigned an ideal NUMA node when virtual machine 530 is started and this information could be stored in thread table 560. When scheduler 552 runs, it can determine that a thread has been assigned an ideal NUMA node and scheduler 552 can generate the list of idle processors from an idle processor map associated with the ideal NUMA node. In this way, the initial set of possible logical processor candidates is reduced without having to check a bitmap listing every logical processor in the computer system.

Operation 1110 of FIG. 11 shows that the virtual cache topology information includes a number of virtual processors sharing a virtual cache. For example, in an embodiment, hypervisor 550 or management system 402 of datacenter 400 can be configured to generate the virtual cache topology that hypervisor 550 exposes to guest operating system 532, which will include a number of virtual processors that share a virtual cache. In an embodiment, the virtual cache topology can include a calculated number of virtual processors that share a virtual cache.

Figure 12:
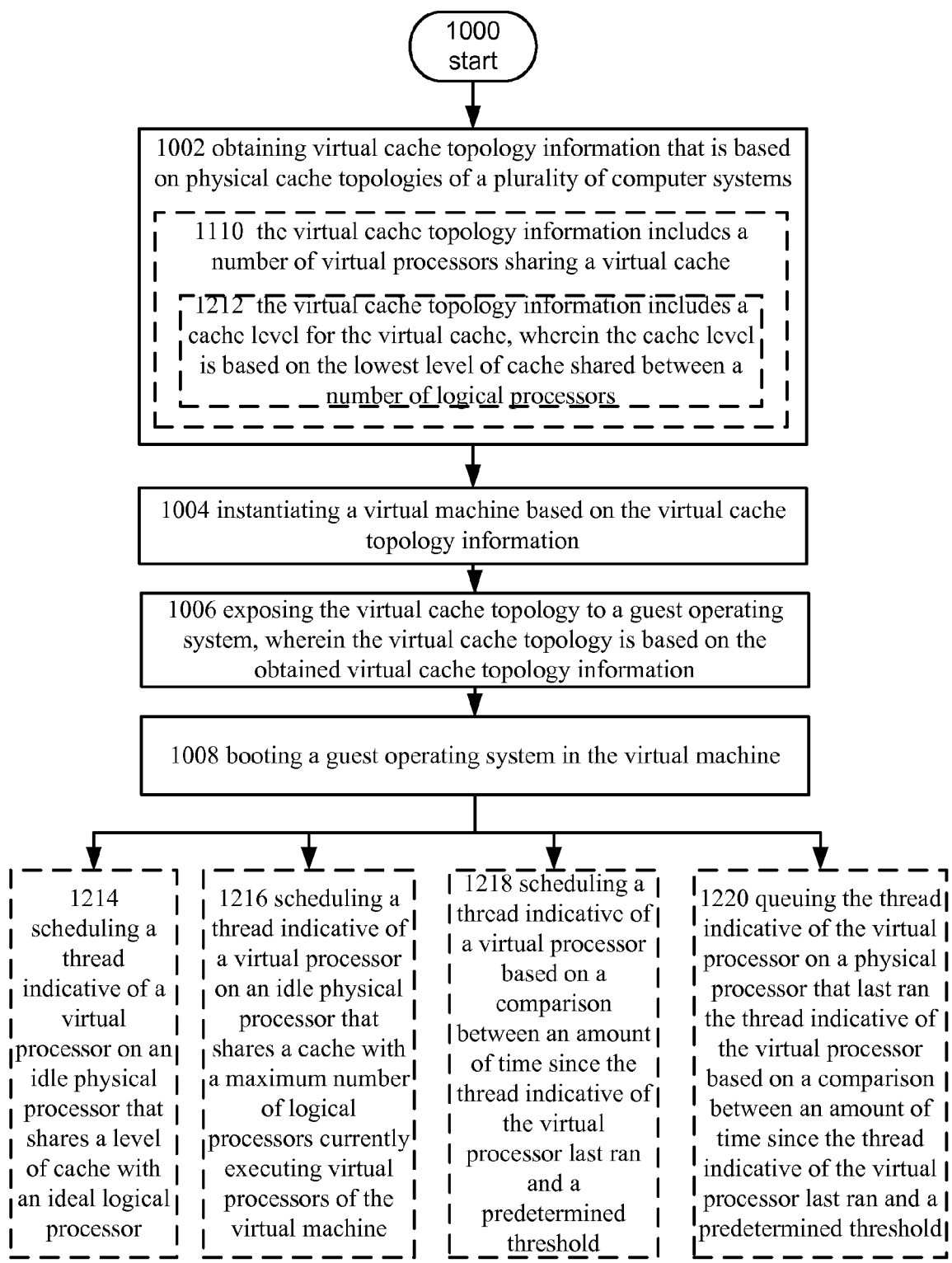
FIG. 12 depicts an alternative embodiment of the operational procedure of FIG. 11.

FIG. 12 illustrates an alternative embodiment of the operational procedure of FIG. 11, including operations 1212, 1214, 1216, 1218, and 1220. Operation 1212 shows the virtual cache topology information includes a cache level for the virtual cache, wherein the cache level is based on the lowest level of cache shared between a number of logical processors. For example, and continuing from operation 1110, in an embodiment, after the number of virtual processors for the virtual cache topology is determined, the type of virtual cache that is shared can be determined. In an example embodiment, the lowest type of cache shared by a number of logical processors equal to or greater than the determined number of virtual processors can be used as the virtual cache.

For example, and referring to FIG. 5, in an embodiment, management system 402 can be configured to receive information describing that NUMA node 500 includes an L2 cache that is shared between four logical processors, an L2 cache shared between two logical processors, and an L3 cache shared between six logical processors. Management system 402 can also receive information that describes that NUMA node 502 includes an L3 cache shared between four logical processors. In this example, management system 402 can determine that NUMA node 500 can support an L2 and L3 cache shared between a number of logical processors equal or greater than the number of virtual processors set for the virtual cache topology. Management system 402 can also determine that NUMA node 502 can support an L3 cache shared between a number of logical processors equal or greater than the number of virtual processors set for the virtual cache topology. Management system 402 can select L3 as the cache to expose in virtual cache topology because it is the lowest cache that can be honored by each NUMA node.

Operation 1214 shows scheduling a thread indicative of a virtual processor on an idle physical processor that shares a level of cache with an ideal logical processor. For example, after virtual cache topology is exposed to virtual machine 530, guest operating system 532 can execute and schedule threads to run on VPs 534-540. Scheduler 552 can receive a request to schedule a thread indicative of a virtual processor and check thread table 560. In this example embodiment, thread table 560 can include information that sets an ideal logical processor for each virtual processor in virtual machine 530. For example, hypervisor 550 could assign ideal logical processors at boot time based on the exposed virtual cache topology. That is, VPs 534 and 536 can be assigned ideal logical processors that share at least an L3 cache. In this example embodiment, if the thread indicative of VP 534 is moved, the next time scheduler 552 is run, it can attempt to move it back to the ideal processor.

Continuing with the description of FIG. 12, operation 1216 shows scheduling a thread indicative of a virtual processor on an idle physical processor that shares a cache with a maximum number of logical processors currently executing virtual processors of the virtual machine. For example, and referring to FIG. 5, in an embodiment, scheduler 552 can receive a request to schedule a thread indicative of, for example, VP 540. In this example, scheduler 552 can be configured to check thread table 560 and determine that virtual machine 530 is not using ideal processors. In response to this determination, scheduler 552 can determine where other virtual processors of virtual machine 530 are executing. For example, VP 534 can be executing on LP 514 and VP 536 can be executing on LP 516. Scheduler 552 can then run and determine which logical processors are available. For example, LP 506 and LP 518 may be available. Scheduler 552 can check cache hierarchy table 556 and determine that LP 506 shares L3 cache with LPs 512-516 and that LP 518 does not share any caches with LPs 512-516. In this example, scheduler 552 can schedule thread indicative of VP 540 on LP 506.

Operation 1218 shows scheduling a thread indicative of a virtual processor based on a comparison between an amount of time since the thread indicative of the virtual processor last ran and a predetermined threshold. In an example embodiment, hypervisor 550 can be configured to balance the efficiency lost due to scheduling quickly versus the efficiency gained by having cache hits. For example, in an embodiment, scheduler 552 may determine that the thread is associated with a latency sensitive workload. That is, the workload, e.g., the programs executed by guest operating system 532, may need to be scheduled as soon as possible when it is received by scheduler 552. In this example embodiment, if a predetermined amount of time since the virtual processor last ran has elapsed, schedule 552 can be scheduled to access cache hierarchy table 556 and determine which available logical processors share cache with, for example, the logical processor that last ran it or one that shares a cache with a maximum number of logical processors currently executing virtual processors of the virtual machine.

Operation 1220 shows queuing the thread indicative of the virtual processor on a physical processor that last ran the thread indicative of the virtual processor based on a comparison between an amount of time since the thread indicative of the virtual processor last ran and a predetermined threshold. In an embodiment, a predetermined amount of time may not have elapsed. In this example embodiment, scheduler 552 can queue the thread on the logical processor that last ran it. As stated above, the predetermined threshold can be set based on performance characteristics of the system and may be adjusted by an administrator or a policy.

Figure 13:
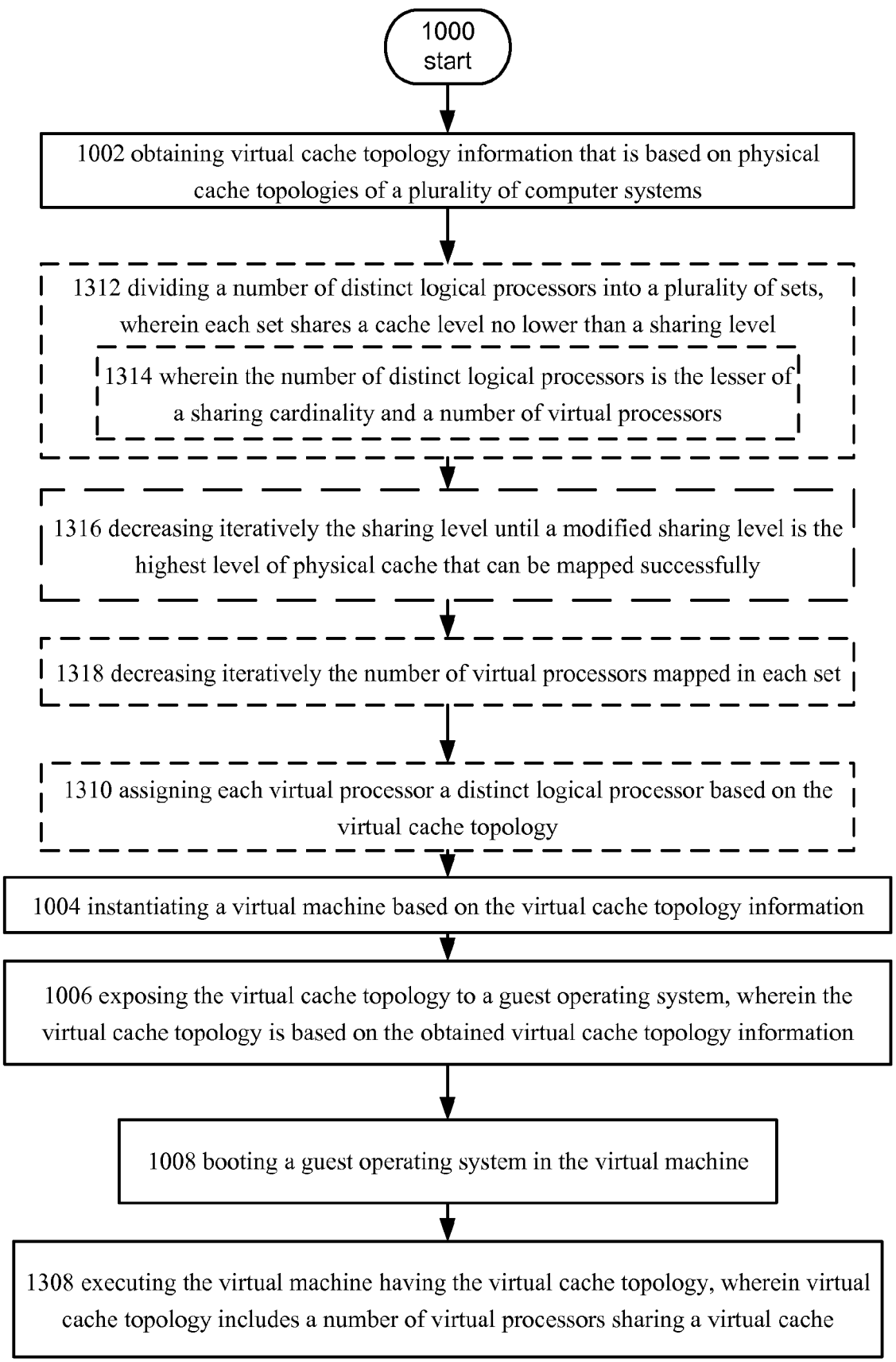
FIG. 13 depicts an alternative embodiment of the operational procedure of FIG. 10.

FIG. 13 illustrates an alternative embodiment of the operational procedure of FIG. 10, including operations 1308, 1310, 1312, 1314, 1316, and 1318. Operation 1308 shows executing the virtual machine having the virtual cache topology, wherein virtual cache topology includes a number of virtual processors sharing a virtual cache. In an embodiment, hypervisor 550 has obtained the virtual cache topology information, which is based on its own physical cache topology, or, in the case of datacenter 400, the physical cache topologies within datacenter 400; instantiated a virtual machine that includes the obtained virtual cache topology, which is based on the virtual cache topology information; and booted a guest operating system in the virtual machine. The hypervisor 550 then executes the virtual machine having the virtual cache topology. Referring to an embodiment in FIG. 5, the virtual cache topology may include two virtual processors sharing a virtual L3 cache.

Operation 1310 shows assigning each virtual processor a distinct logical processor based on the virtual cache topology. In this embodiment, the hypervisor 550 assigns each virtual processor a distinct logical processor. Operation 1312 shows dividing a number of distinct logical processors into a plurality of sets, wherein each set shares a cache level no lower than a sharing level. The sharing level is the highest level of interconnecting cache that can be honored for the sets of distinct logical processors. In this operation, the virtual processors are mapped to logical processors. In an embodiment, operation 1314 shows the number of distinct logical processors is the lesser of a sharing cardinality and a number of virtual processors. For example, if the sharing cardinality is four, but the number of virtual processors is three, the number of distinct logical processors will be three.

Operation 1316 shows decreasing iteratively the sharing level until a modified sharing level is the highest level of physical cache that can be mapped successfully. In an embodiment, hardware may have changed since the virtual cache topology was calculated by the management system 402 or the administrator may have set a virtual cache topology that cannot be honored by the physical cache topology. If this is the case, the virtual processors may not be able to be mapped successfully to the available logical processors. In an embodiment, the sharing level is iteratively decreased only until the virtual processors may be successfully mapped to the logical processors. In this context, to decrease a sharing level means to decrease the level from, for example, L2 to L3, then from L3 to L4, etc. . . . . If this is not successful and the sharing level may not be decreased any further, operation 1318 shows decreasing iteratively the number of virtual processors mapped in each set. The number of virtual processors in each set is decreased until mapping of virtual processors to logical processors is successful at the lowest sharing level. Even though the number of virtual processors in the set will be decreased, the virtual cache topology that is exposed to the guest operating system will not be affected.

Figure 14:
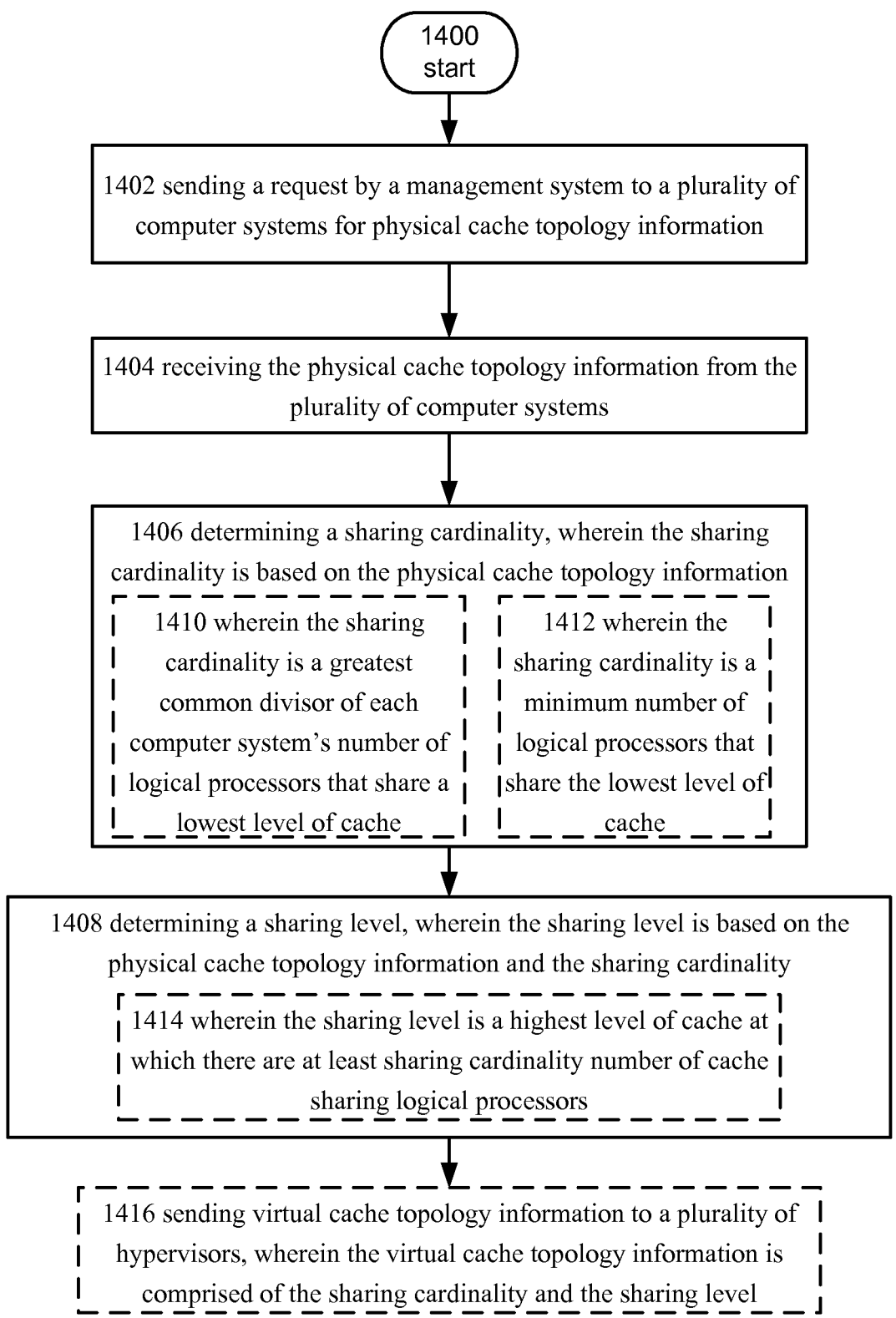
FIG. 14 depicts operational procedure for practicing aspects of the present disclosure.

FIG. 14 illustrates an operational procedure for practicing aspects of the present disclosure including operations 1400, 1402, 1404, 1406, 1408, 1410, 1412, 1414, and 1416. Operation 1400 begins the operational procedure and operation 1402 shows sending a request by a management system to a plurality of computer systems for physical cache topology information. Hypervisor 550 may query its own physical topology. In an embodiment including a datacenter, management system 402 sends a request to the computer systems in datacenter 400 for each computer system's physical cache topology Operation 1404 shows receiving the physical cache topology information from the plurality of computer systems. In one embodiment, hypervisor 550 responds to the management system with a physical cache topology through vendor specific mechanisms. In another embodiment, hypervisor 550 responds with a physical cache topology through a hypercall. In an embodiment, the management system 402 receives the physical cache topology for the computers in the datacenter 400.

Operation 1406 shows determining a sharing cardinality, wherein the sharing cardinality is based on the physical cache topology information. Operation 1408 shows determining a sharing level, wherein the sharing level is based on the physical cache topology information and the sharing cardinality. The management system 402 determines a virtual cache topology that can be honored by at least most of the computer systems, by determining the sharing cardinality and the sharing level.

The sharing cardinality, for example, is the a number of logical processors shared by a cache, as may be determined by the management system 402. Operation 1410 shows one method of determining the sharing cardinality, using a greatest common divisor of each computer system's number of logical processors that share a lowest level of cache. In an example embodiment, the number of processors can be determined by calculating the greatest common divisor of logical processors that share a lowest level of cache for each NUMA node in datacenter 400. In an example embodiment where each computer system has a topology the same as the physical topology described in FIG. 5, management system 402 can be configured to determine the lowest level of cache in each NUMA node, L3 cache in this example, and determine the number of logical processors in each NUMA node that shares this level of cache, i.e., six in NUMA node 500 and four in NUMA node 502. Management system 402 can then determine that the greatest common divisor of six and four is two. This value can be set as the number of virtual processors that share a level of cache in the virtual cache topology.

Operation 1412 shows an alternative method of determining the sharing cardinality, using a minimum number of logical processors that share the lowest level of cache. For example, management system 402 can determine the number of logical processors that share the lowest level of cache in each NUMA node. Management system 402 can then set the smallest number of logical processors as the number of virtual processors that share a level of cache in the virtual cache topology. For example, management 402 can receive information that describes that L3 is the lowest level of cache shared by LPs 506-516 and L3 is the lowest level of cache shared by LPs 518-524. Management system 402 can then determine that six and four logical processors share respective lowest levels of cache in the computer systems in. In this example embodiment, management system 402 can select the smallest number, which is four, and set it as the number of virtual processors that share a level of cache in the virtual cache topology.

Operation 1408 shows determining a sharing level. The sharing level is the highest level of cache that can be honored by the physical cache topologies, as may be determined by management system 402. Operation 1414 shows that the sharing level may a highest level of cache at which there are at least sharing cardinality number of cache sharing logical processors. In the two alternative methods of determining sharing cardinality above, the first had a sharing cardinality of two and the second had a sharing cardinality of four. In both cases, the sharing level would be L3 because NUMA node 502 only has L3 shared cache, which can accommodate the sharing cardinality of either two or four.

Operation 1416 shows sending virtual cache topology information to a plurality of hypervisors, wherein the virtual cache topology information is comprised of the sharing cardinality and the sharing level. In an embodiment, management system 402 passes the sharing cardinality and the sharing level to the hypervisors. This is the virtual cache topology that may now be used when a hypervisor instantiates a virtual machine.

Figure 15:
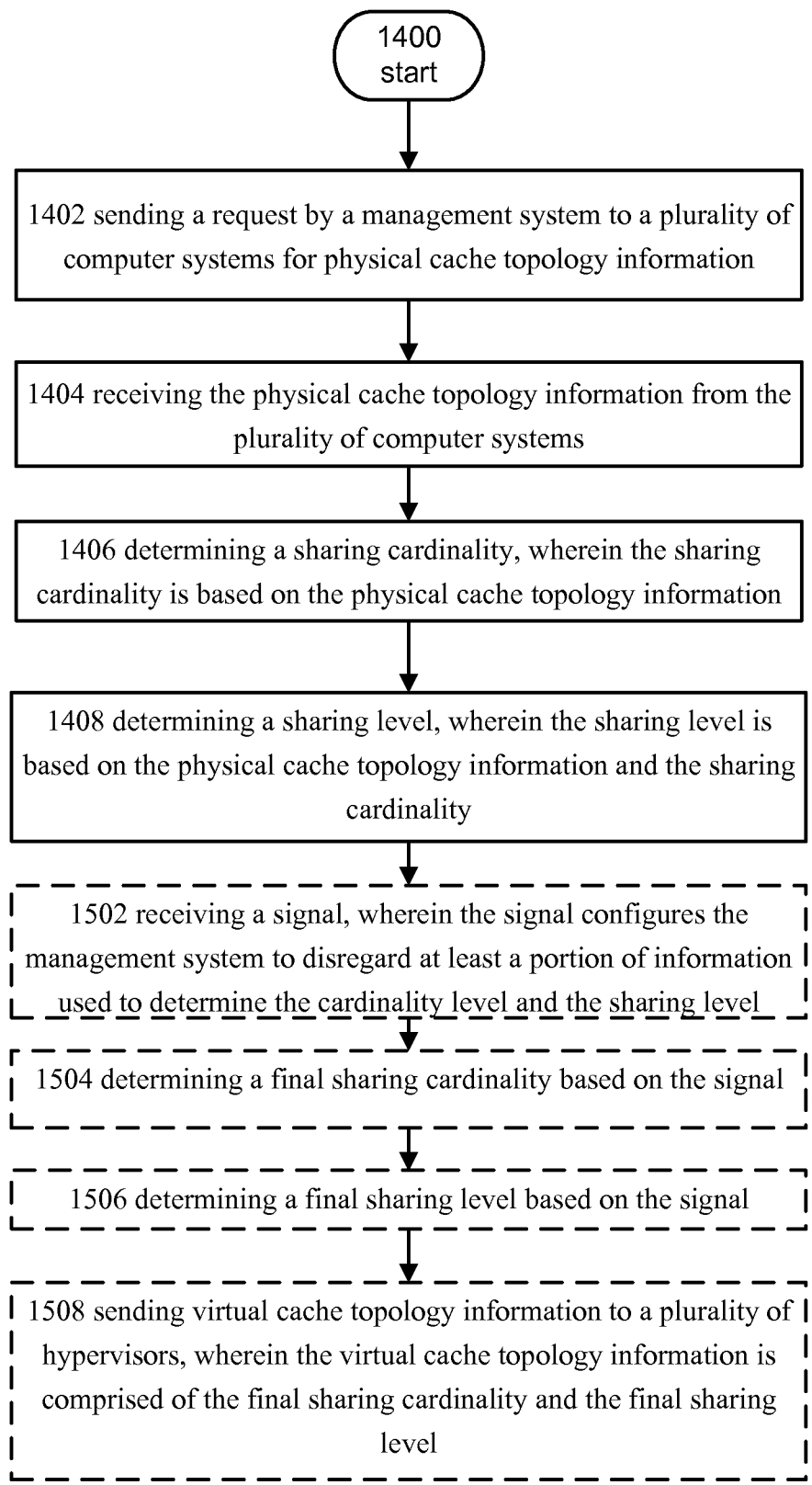
FIG. 15 depicts an alternative embodiment of the operational procedure of FIG. 14.

FIG. 15 depicts an alternative embodiment of the operational procedure of FIG. 14. As shown by FIG. 15, the operational procedure includes operations 1502, 1504, 1506, and 1508. Operation 1502 shows receiving a signal, wherein the signal configures the management system to disregard at least a portion of information used to determine the sharing cardinality and the sharing level. In this operation, management system 402 may override the calculation of the sharing cardinality and/or sharing level. For example, this override may be set via policy by a system administrator or the management system 402 itself. In embodiments, these directions could include disregarding certain systems and/or cache hierarchies, using an alternate formula, accepting a pre-determined sharing level, accepting a pre-determined sharing cardinality, or accepting combinations of these directions when determining the virtual cache topology. Using this direction, operation 1504 shows determining a final sharing cardinality based on the signal and operation 1506 shows determining a final sharing level based on the signal. The final sharing cardinality and the final sharing level determine the virtual cache topology in this embodiment. Operation 1508 shows sending virtual cache topology information to a plurality of hypervisors, wherein the virtual cache topology information is comprised of the final sharing cardinality and the final sharing level. With this information, for example, hypervisor 550 may instantiate a virtual machine that includes a virtual cache topology that may reasonably be honored by the physical cache topology of the host computer.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer readable storage memory device that is not a signal including executable instructions, comprising:
   instructions for calculating a virtual cache topology based on a physical cache topology of a computer system, wherein the virtual cache topology calculated with respect to cache levels shared when virtual processor instructions are executed on a plurality of logical processors;
   instructions for instantiating a virtual machine comprising one or more virtual processors having the virtual cache topology;
   instructions for exposing the virtual cache topology to a guest operating system, and
   instructions for booting the guest operating system in the virtual machine.

2. A computer readable storage memory device of claim 1, further comprising: instructions for generating a list of idle logical processors from a list of logical processors in a non-uniform memory architecture (NUMA) node in response to receiving a request to schedule a thread indicative of a virtual processor.

3. A computer readable storage memory device of claim 1, wherein the virtual cache topology includes a number of virtual processors sharing a virtual cache.

4. A computer readable storage memory device of claim 3, wherein the virtual cache topology includes a cache level for the virtual cache, wherein the cache level is based on the lowest level of cache shared between a number of logical processors.

5. A computer readable storage memory device claim 3, further comprising: instructions for scheduling a thread indicative of a virtual processor on an idle physical processor that shares a level of cache with an ideal logical processor.

6. A computer readable storage memory device claim 3, further comprising: instructions for scheduling a thread indicative of a virtual processor on an idle physical processor that shares a cache with a maximum number of logical processors currently executing virtual processors of the virtual machine.

7. A computer readable storage memory device claim 3, further comprising: instructions for scheduling a thread indicative of a virtual processor based on a comparison between an amount of time since the thread indicative of the virtual processor last ran and a predetermined threshold.

8. A computer readable storage memory device of claim 3, further comprising: instructions for queuing the thread indicative of the virtual processor on a physical processor that last ran the thread indicative of the virtual processor based on a comparison between an amount of time since the thread indicative of the virtual processor last ran and a predetermined threshold.

9. A computing system, comprising:
a logical processor;
a cache memory organized according to a cache topology;
a memory; and
computer-executable instructions stored in the memory, wherein said computer-executable instructions comprises:
instructions for calculating a virtual cache topology that is based on a physical cache topology of a plurality of computer system, the virtual cache topology information calculated with respect to cache levels shared when virtual processor instructions are executed on a plurality of logical processors;
instructions for instantiating a virtual machine comprising one or more virtual processors having the virtual cache topology;
instructions for exposing the virtual cache topology to a guest operating system; and
instructions for booting a guest operating system in the virtual machine.

10. The system of claim 9, further comprising:
instructions for assigning each virtual processor a distinct logical processor based on the virtual cache topology.

11. The system of claim 10, further comprising:
instructions for dividing a number of distinct logical processors into a plurality of sets, wherein each set shares a cache level no lower than a sharing level and mapping a distinct logical processor from the plurality of sets to a virtual processor.

12. The system of claim 11, wherein the number of distinct logical processors in each set is the lesser of a sharing cardinality and the number of virtual processors.

13. The system of claim 12, further comprising:
instructions for decreasing iteratively the sharing level until a modified sharing level is the highest level of physical cache that can be mapped successfully.

14. The system of claim 13, further comprising:
instructions for decreasing iteratively the number of virtual processors mapped in each set.

15. A computer implemented method for generating a virtual cache topology for virtual machines operable to execute on a plurality of computer systems, comprising:
sending a request by a management system to a plurality of computer systems for physical cache topology information;
receiving the physical cache topology information from the plurality of computer systems;
determining a sharing cardinality, wherein the sharing cardinality is based on the physical cache topology information;
determining a sharing level, wherein the sharing level is based on the physical cache topology information and the sharing cardinality; and
calculating a virtual cache topology that can be honored by a majority of the plurality of computer systems.

16. The method of claim 15, wherein the sharing cardinality is a greatest common divisor of each computer system's number of logical processors that share a lowest level of cache.

17. The method of claim 15, wherein the sharing cardinality is a minimum number of logical processors that share the lowest level of cache.

18. The method of claim 15, wherein the sharing level is a highest level of cache at which there are at least sharing cardinality number of cache sharing logical processors.

19. The method of claim 15, further comprising:
sending virtual cache topology information to a plurality of hypervisors, wherein the virtual cache topology information is comprised of the sharing cardinality and the sharing level.

20. The method of claim 15, further comprising:
receiving a signal, wherein the signal configures the management system to disregard at least a portion of information used to determine the cardinality level and the sharing level;
determining a final sharing cardinality based on the signal;
determining a final sharing level based on the signal; and
sending virtual cache topology information to a plurality of hypervisors, wherein the virtual cache topology information is comprised of the final sharing cardinality and the final sharing level.

* * * * *